US010839714B2

(12) United States Patent
Wasserman

(10) Patent No.: US 10,839,714 B2
(45) Date of Patent: Nov. 17, 2020

(54) SYSTEM AND METHOD FOR LANGUAGE LEARNING

(71) Applicant: Zoundslike, LLC, Los Angeles, CA (US)

(72) Inventor: Mark Wasserman, Los Angeles, CA (US)

( * ) Notice: Subject to any disclaimer, the term of this patent is extended or adjusted under 35 U.S.C. 154(b) by 251 days.

(21) Appl. No.: 15/791,900

(22) Filed: Oct. 24, 2017

(65) Prior Publication Data

US 2019/0122578 A1 Apr. 25, 2019

(51) Int. Cl.
| G09B 19/06 | (2006.01) |
| G09B 5/10 | (2006.01) |
| G09B 5/06 | (2006.01) |
| G06F 40/232 | (2020.01) |
| G06F 40/253 | (2020.01) |

(52) U.S. Cl.
CPC ........... *G09B 19/06* (2013.01); *G06F 40/232* (2020.01); *G06F 40/253* (2020.01); *G09B 5/06* (2013.01); *G09B 5/10* (2013.01)

(58) Field of Classification Search
CPC . G09B 19/06; G09B 5/06; G09B 5/10; G09B 5/00; G06F 17/273; G06F 17/234; G06F 40/23; G06F 40/232
See application file for complete search history.

(56) References Cited

U.S. PATENT DOCUMENTS

| 2011/0318723 | A1* | 12/2011 | Jeong | G09B 7/08 |
| | | | | 434/350 |
| 2014/0100844 | A1* | 4/2014 | Stieglitz | G09B 19/06 |
| | | | | 704/3 |
| 2014/0134576 | A1* | 5/2014 | Edge | G09B 19/04 |
| | | | | 434/157 |

\* cited by examiner

*Primary Examiner* — Timothy A Musselman
(74) *Attorney, Agent, or Firm* — Rhodes Donahoe, LLC; Robert V. Donahoe

(57) ABSTRACT

A method for peer-to-peer learning of a common language by a plurality of students. A first student selected from the plurality of students acts as a speaker in the common language with a second student selected from the plurality of students acting as a speller. A word-deck is generated for use by the student-group. The word-deck includes a plurality of words that are selected because they are related to another word, respectively, found in the common language based on a phonetic similarity between the respective words. The first student is provided with a word selected from the plurality of words included in the word-deck where the word has a correct spelling. An audio output is provided to the second student where the audio output includes the word as spoken by the first student. An entry includes a spelling of the word as spelled by the second student following a receipt of the audio output. If the spelling of the word matches the correct spelling of the word, a score for the student-group is improved.

16 Claims, 13 Drawing Sheets

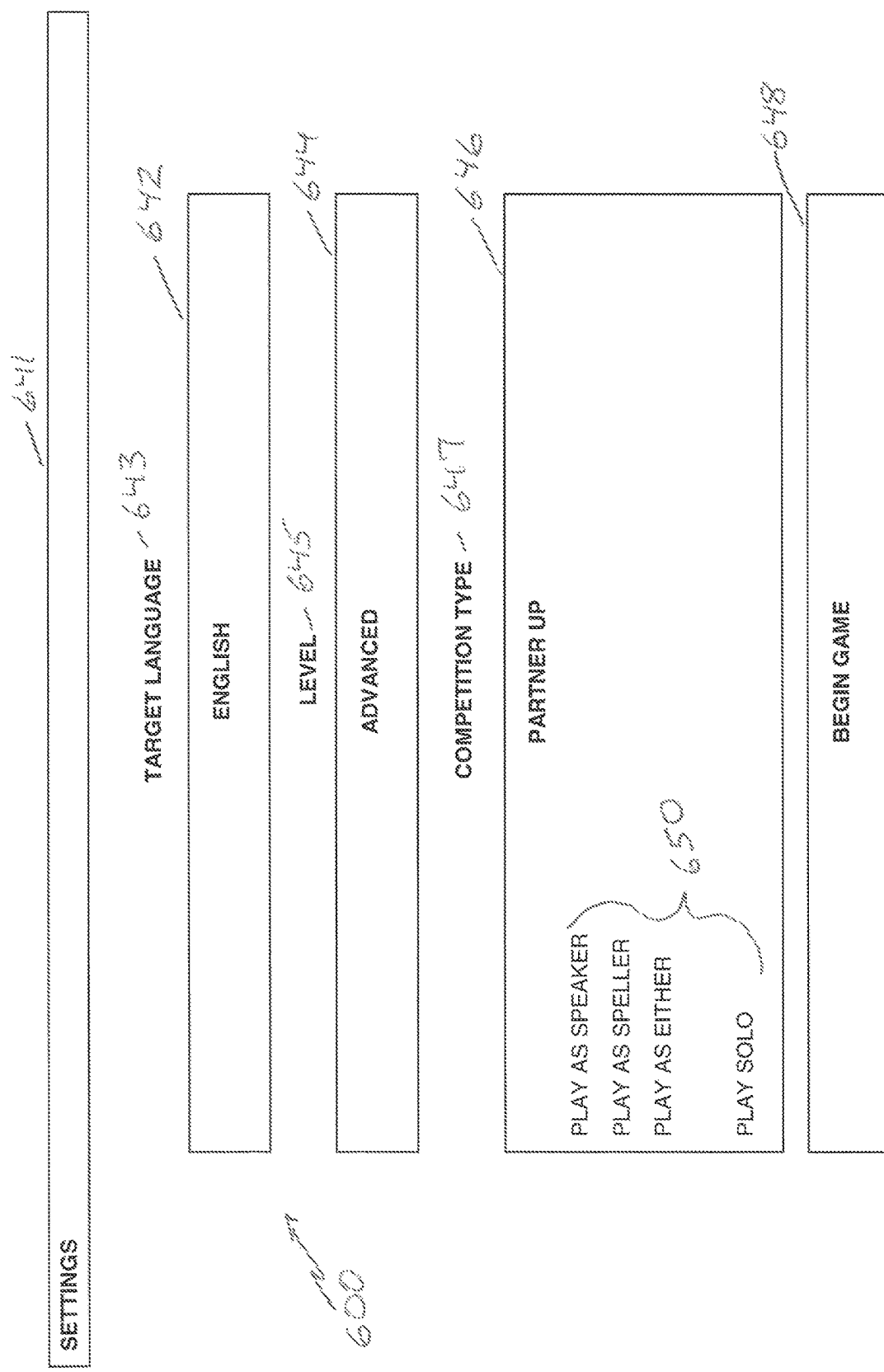

RESULTS

YOU SCORED 2 OUT OF A POSSIBLE 6 POINTS — 1173

| WORD | YOUR WROTE | SCORE |
|---|---|---|
| CLOTHING | CLOSING | 0 |
| MANSION | MENTION | 0 |
| BETTER | BETTER | 2 |

RETURN TO SETTINGS PAGE

FIG. 11

WORDS IN CONTEXT — 1241

We cannot buy clothing because the store is closing.
Did I mention I bought a mansion?
It is better to be hopeful instead of bitter.

SYSTEM AND METHOD FOR LANGUAGE LEARNING

BACKGROUND OF INVENTION

1. Field of Invention

This invention relates generally to systems and methods for language learning. More specifically, at least one embodiment relates to systems and methods for the peer-learning of a second language.

2. Discussion of Related Art

Globalization is facilitated by modern technology that removes many of the barriers that would otherwise discourage individuals in different parts of the globe from socializing and working with one another. Airplanes and the telephone are two technology-based tools that have now been widely used for many decades to facilitate collaboration between individuals separated from one another by hundreds or thousands of miles. The Internet increases these opportunities including the opportunity to meet and speak with other individuals from around the globe (for example, via a video call). These factors also increase the likelihood of a conversation between individuals whose native languages differ from one another. This presents the obvious difficulty of finding a way to verbally communicate with one another.

Learning a new language is a great challenge for most individuals. As a result, a wide variety of language-learning tools and approaches have developed to try to meet the continually growing need of individuals to learn a second language. Approaches range from cultural immersion, to classroom instruction, to the use of on-line and other software language-learning tools. For most individuals, cultural immersion is unrealistic because it requires travel, significant time, and significant cost. That is, most individuals cannot afford to relocate for the purpose of learning a new language. Further, even where a local community is available that speaks the language the student is interested in learning, the student likely cannot afford the time commitment required to immerse themselves in that community to the extent necessary to learn the language.

Classroom instruction is costly for students. It also requires that the student maintain a fixed schedule to attend a series of classroom sessions. The preceding can also be true for students who attend an on-line or virtual classroom. Further, classroom instruction tends to employ a top-down model where an instructor makes all the decisions regarding the substance of the lesson, the manner in which students receive their instruction and how the students are evaluated. The preceding creates a structure where student engagement and achievement is heavily dependent on the knowledge and skills of the instructor. Consequently, there can be great variability from one classroom to the next because of the wide variability in the skill-level and subjective approach employed by each instructor. The preceding results in wide variability in the teaching-methodology employed in a class, the overall classroom environment and student success.

Technology-based solutions can offer a more consistent approach than traditional classroom instruction. However, technology-based solutions often provide a "socially closed" academic environment because students don't have any classmates (real or virtual). As a result, these technology solutions do not provide any "social learning." That is, these approaches do not provide an environment in which students learn with classmates and/or peers.

Some technology-based solutions do connect students to one another, for example, via the Internet. One such approach employs what is referred to as a "learning exchange" in which a first student fluent in a first language teaches the first language to a second student fluent in a second language. The approach is reciprocal because the second student teaches the first student the second language as a part of the approach. However, the preceding approach does not provide a consistent process by which the students learn or a consistent set of metrics by which outcomes are measured. Also, students that are learning different languages may struggle with completely different problems because the vocabulary, rules of grammar, syntax, tense and gender can widely vary from one language to the next.

In one sense, each student takes on the role of the instructor because they provide the feedback and encouragement to the other. However, while this may give the "teaching" student increased confidence in their native language, the approach suffers from many of the same quality/variability issues found in classroom instruction because the knowledge and skills of one individual plays a significant part in the success or failure of the instruction.

SUMMARY OF INVENTION

Therefore, there is a need for systems and methods that provide approaches by which students collaborate to learn the same language. These approaches can include peer-to-peer learning to increase the efficiency and effectiveness of the process by which students learn different elements of the same language concurrently. According to some embodiments, these systems and methods provide a "social learning environment" that improves student achievement when compared with either individualized learning or socially closed academic environments.

In various embodiments, the systems and methods described herein employ words that phonetically resemble other words, respectively, in a given target language. The use of these phonetic-pairs can greatly increase the rate-of-learning of both speech and spelling in the target language. Embodiments described herein are employed by language learners who already have some familiarity with the target language. This familiarity assists the language learners because it provides them the background by which they can understand that a relationship exists between the words that are phonetically similar in the target language, i.e., a "phonetic relationship."

According to one aspect, a method for peer-to-peer learning of a common language by a plurality of students is provided. According to one embodiment, the method includes grouping a first student selected from the plurality of students to act as a speaker in the common language with a second student selected from the plurality of students to act as a speller in the common language. A word-deck is generated for use by the student-group, where the word-deck includes a plurality of words. According to this embodiment, the words are selected for inclusion in the word-deck because they are related to another word, respectively, found in the common language based on a phonetic similarity between the respective words. The first student is provided with a word selected from the plurality of words included in the word-deck, the word including a correct spelling. An audio output is provided to the second student, the audio output including the word as spoken by the first student. An entry including a spelling of the word as spelled by the second student is received following a receipt of the audio output. The spelling of the word is compared with the correct spelling. If the spelling of the word matches the correct spelling of the word, a score for the student-group is improved.

According to another aspect, a non-transitory computer-readable medium whose contents cause a processing device including a processor to perform a method of providing peer-to-peer learning of a common language by a plurality of students is provided. According to one embodiment, the method includes grouping a first student selected from the plurality of students to act as a speaker in the common language with a second student selected from the plurality of students to act as a speller in the common language. A word-deck is generated for use by the student-group. The word-deck includes a plurality of words where the words are selected for inclusion in the word-deck because they are related to another word, respectively, found in the common language based on a phonetic similarity between the respective words. A first student is provided with a word selected from the plurality of words included in the word-deck, the word including a correct spelling. An audio output is provided to the second student the audio output including the word as spoken by the first student. An entry including a spelling of the word as spelled by the second student is received following a receipt of the audio output. The spelling of the word is compared with the correct spelling. If the spelling of the word matches the correct spelling of the word, a score for the student-group is improved.

According to another embodiment, a system is provided for a simultaneous teaching of speaking and spelling in a common language to a plurality of students, the system employing a network to place the plurality of students in communication with one another. According to one embodiment, the system includes a social logic engine configured to provide identifying information concerning each of the plurality of students to others included in the plurality of students. The identifying information is employed by a first student included in the plurality of students to form a student-group with a second student included in the plurality of students. The student-group is formed with the first student identified as a speaker in the common language and the second student identified as a speller in the common language. A word-deck builder is included in the system. The word-deck is configured to generate a word-deck for use by the student-group, the word-deck including words that are selected for inclusion in the word-deck because they are related to another word, respectively, found in the common language based on a phonetically similarity between the respective words.

According to a further embodiment, a game management engine is configured to provide the first student with a plurality of words selected from the word-deck during a timed-period. The plurality of words is displayed serially to the first student, each of the plurality of words including a correct spelling, respectively. The first student provides a series of audio inputs each of audio inputs including a word selected from the word deck, respectively, as spoken by the first student, and the audio input is communicated to the second student via the network. The second student provides a series of entries each including a spelling of one of the respective words as spelled by the second student following a receipt of an audio output including the respective word as spoken by the first student. The game management engine is configured to, for all of the series of entries received during the timed-period, compare the spelling of the respective word to a correct spelling of the respective word. A score for the student-group is improved if the spelling of the respective word matches the correct spelling of the respective word.

As used herein, the term "common" when referring to a language refers to the same language. In view of the preceding, one of ordinary skill in the art will recognize that U.S. English and UK English are a common language, while Italian and Spanish are not common languages as the term "common" is employed herein with reference to a language.

As used herein, the term "native" with reference to language refers to a language learned by the student because it is the primary language of the society in which the student was (or is being) raised. For example, the primary language in the U.S. is English. As a result, one of ordinary skill in the art will recognize in view of the preceding that English is the native language of a child of a family of immigrants residing in the U.S. but speaking Spanish in the home. The preceding is true because English is the primary language in school and elsewhere in public in the society in which the child is being raised. One of ordinary skill will also recognize in view of the preceding that an individual may possess multiple primary languages in some limited circumstances. For example, in Montreal, Quebec, both English and French are employed as primary languages despite the recognition of French as the official language by the provincial government.

As used herein, the term "target" when used in the phrase "target language" refers to the language that a user or users are learning. As used herein, the term "peer," for example, when used in the phrase "peer-to-peer" refers to a group of two or more individuals who are grouped together because they are learning a common target language. As will be apparent to one of skill in the art, in view of the disclosure herein, peers can learn a common target non-native language together. Further, where a student's developmental needs warrant, peers can also learn a common target native language together.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 6-12 illustrate user interfaces in accordance with one embodiment.

DETAILED DESCRIPTION

Figure 1:
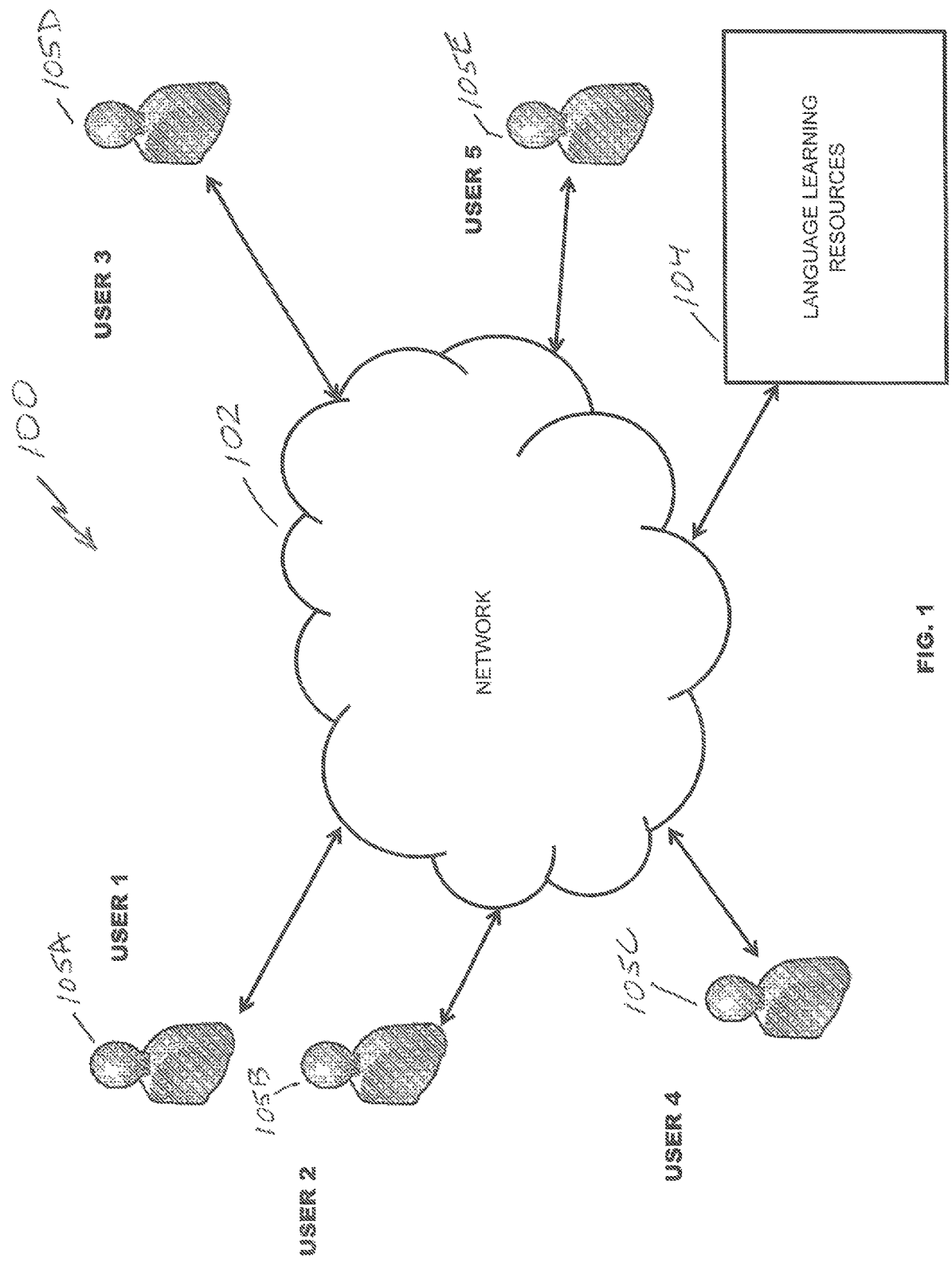
FIG. 1 illustrates a system including a network operating environment for language learning in accordance with one embodiment.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

FIG. 1 illustrates a system 100 including a network operating environment for language learning. According to the illustrated embodiment, the system 100 includes a network 102 and resources 104 employed by a plurality of users 105 (illustrated as the users 105A-105E). In some embodiments, the users 105A-105E include students learning a second language. As is explained in greater detail with reference to FIG. 2, the users 105A-105E can work alone or with one or more of the other users utilizing the resources 104 for language learning. For example, depending on the embodiment, a first user 105A can employ the resources 104 in various language-learning processes that may be accomplished without involving any of the other users 105B-105E, i.e., solo. Alternatively, the first user 105A can employ the resources 104 in various language learning processes with another one of the users 105B-105E or with two or more of the other users 105B-105E.

In general, the network 102 can include either or both of local-area networks (LANs), wide area networks (WANs), wireless communication, wired communication, combinations of wireless and wired communication and may include the Internet. According to a further embodiment, the network 102 provides access "over-the-cloud" to one or more remote devices, servers, application resource management and/or data storage systems. For example, the network 102 can allow communication between the plurality of users 105 located geographically remote from one another via electronic devices accessible to the each of the users 105A-105E, respectively. Depending on the embodiment, communication can occur using any of Wi-Fi networks, Bluetooth™ communication, cellular networks, satellite communication, and peer-to-peer networks available either alone or in combination with one another via the network 102. Other communication protocols and topologies can also be implemented in accordance with various embodiments.

Embodiments described herein facilitate language learning by providing the plurality of users 105 with an ability to engage in fun and competitive activities that are focused on language learning. Further, in various embodiments, the system 100 allows the plurality of users 105 to readily locate and communicate with peers and to participate in language learning with them. The peer relationships assist in providing an environment where individuals at a common skill level in a common language are highly motivated to advance their skills in the common language. Users working with other language learners can be motivated by pressure to succeed in front of their peers, a desire to successfully collaborate with their peers and/or a desire to not let their peer/teamates down. The activities provided by the system 100 can allow users to engage in timed language-learning exercises that they play solo against the clock, that they play teamed with one more users against the clock or that they play teamed against others of the plurality of users 105.

Figure 2:
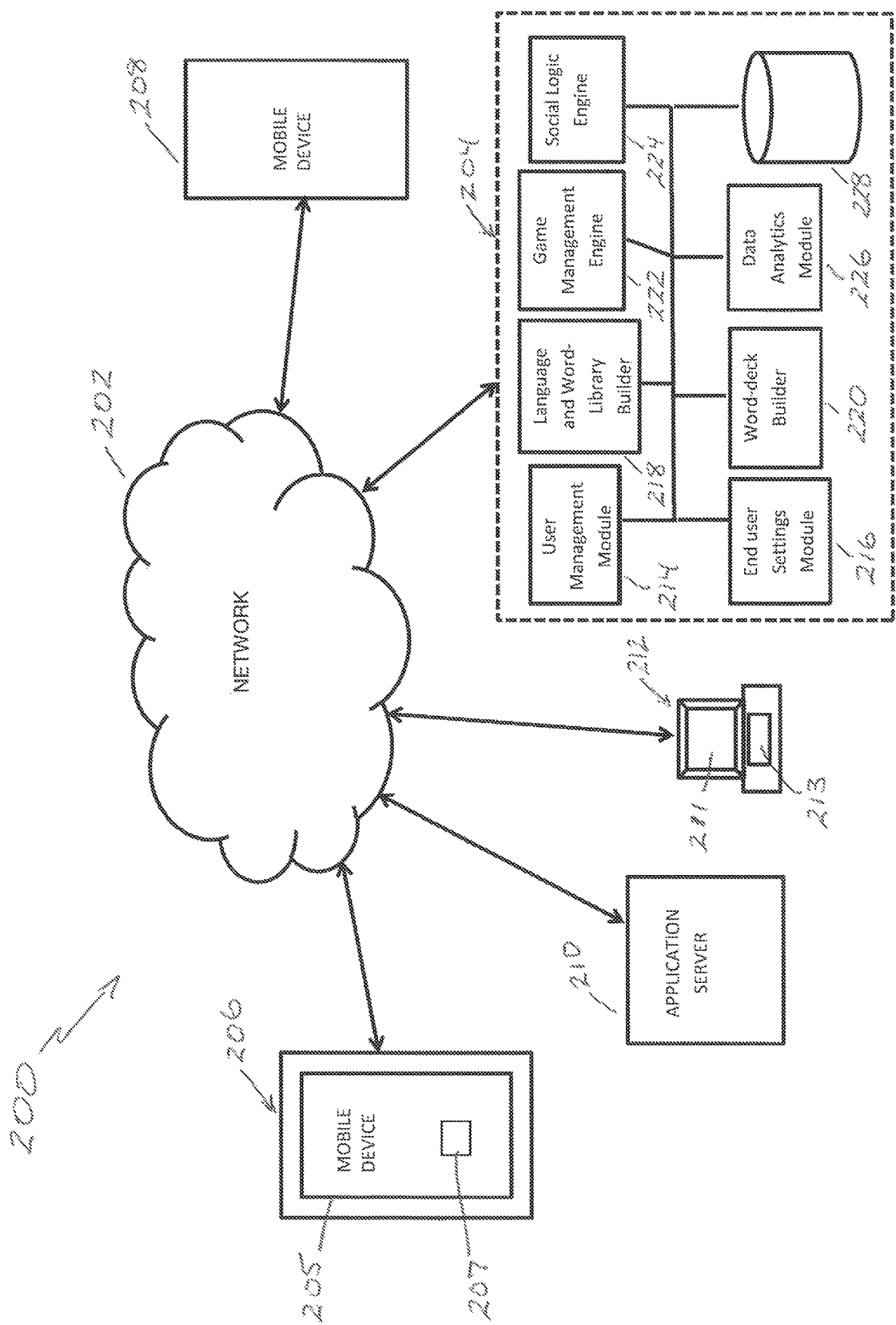
FIG. 2 illustrates a system including a network operating environment for language learning in accordance with a further embodiment.

Referring now to FIG. 2, a system 200 including a network operating environment for language learning is illustrated in accordance with a further embodiment. According to the illustrated embodiment, the system 200 includes a network 202, resources 204, a first mobile device 206, a second mobile device 208, an application server 210 and an additional user device 212. According to various embodiments, the resources 204 include resources and provide services that are remotely accessible by the devices 206, 208, 212 for use in initiating, monitoring and controlling various operations provided by the system 200.

For clarity, FIG. 2 only illustrates the first mobile device 206, the second mobile device 208 and the additional user device 212. However, one of ordinary skill in the art will recognize in view of the disclosure provided herein that the system 200 can include any number of mobile devices 206, 208 and additional user devices 212. Further, for clarity, FIG. 2 does not illustrate the plurality of users 105 provided in FIG. 1. However, one of ordinary skill in the art will also recognize that the various end user devices 206, 208, 212 are operated by respective users for the language learning processes described herein.

In the illustrated embodiment, the resources 204 include a user management module 214, an end user settings module 216, a language and word-library builder 218, a word-deck builder 220, a game management engine 222, a social logic engine 224, a data analytics module 226 and one or more databases 228. The resources 204 and related services are described in more detail herein. As should be apparent to one of ordinary skill in the art in view of the disclosure provided herein, the resources 204 can include different resources and/or services, additional resources and/or services and different combinations of resources and/or services depending upon the embodiment. For example, in one embodiment, the application server 210 is included in the resources 204. According to some embodiments, the resources 204 are included in a computer that operates to complete all or portions of the approaches described herein. The computer can include, for example, one or more processors connected to one or memory devices, such as random access memory (RAM) and/or read only memory (ROM) including one or more of a disk drive, a flash drive, or other device for storing data. Accordingly, any of the embodiments described herein can include a non-transitory computer readable medium in which instructions are stored that when executed by a processing system implementing aspects described herein. Further, in some embodiments, the system 200 operates in a client server configuration with the resources 204 operating as the host and the user devices 206, 208, 212 operating as the client.

In various embodiments, a language-learning operator provides the resources 204 described herein for access over the Internet. For example, in some embodiments, the language-learning operator provides a web-hosted software application suitable for use in a graphical user interface on the devices 206, 208, 212. In other embodiments, the language-learning operator provides computer software in the form of application software (for example, a mobile app) suitable for download. In a still further embodiment, a web-hosted software application and a mobile app are provided for use in combination with one another.

In each of the preceding embodiments, the software application provides users with access to the tools needed to create user accounts, manage user settings and participate in language learning exercises via a system provided by the language-learning operator, for example, via the resources 204. In some embodiments, the language-learning operator provides various language learning games that can be played solo or by groups of users in communication with one another and/or resources 204 via the network 202.

According to various embodiments, the mobile devices 206, 208 can be, for example any of a portable device such as a tablet computer, a hand-held computer, a personal digital assistant, a cellular telephone, a smart phone and/or other processing devices. The additional user devices 212 can include a desktop computer or other device having limited or no mobility but suitable for communicating with other devices, systems and/or resources connected via the network 202.

The user devices, for example, 206, 208, 212 are each associated with a respective user during active language learning sessions. In some instances, a single device 206, 208, 212 can be employed by different users, respectively, in separate language learning sessions provided that the sessions are not concurrent.

Depending on the embodiment, the user devices can employ touch, voice or keyboard/mouse based inputs used to access resources 204 and provide user inputs for language learning. Thus, the devices 206, 208, 212 can include a general purpose processor (CPU), a graphics processing unit (GPU), a memory, a display (for example, a touchscreen) and additional processing devices, for example, a compression/decompression module and/or a communication module. The devices 206, 208, 212 may have a plurality of input/output interfaces and devices such as a mouse, a joystick, a touchscreen, a keyboard, etc. Further, the devices 206, 208, 212 can include any one or any combination of peripheral devices, for example, a positioning system, an RF transceiver, other communications hardware, a motion sensor, one or more additional sensors, a video camera, a microphone, and an audio output including a speaker and/or annunciators.

In the illustrated embodiment, the first user device includes a display 205 and a memory 207. The additional user devices 212 include a display 211 and a memory 213. For clarity, the display and the memory are not illustrated in the second mobile device 208. However, the description concerning the first mobile device 206 also applies to the second mobile device 208. Depending on the embodiment, the memory 207, 213 can include one or memory devices, such as random access memory (RAM) and/or read only memory (ROM) including one or more of a disk drive, a flash drive, or other device for storing data. Each of the first mobile device 206, the second mobile 208 and the additional user devices 212 include a processor. Accordingly, the memory 207, 213 can include a non-transitory computer readable medium in which instructions are stored that when executed by a processing system implementing aspects including the language-learning processes described herein.

In some embodiments, the devices 206, 208, 212 include a display (for example, the display 205, 211) configured to present a user interface to a user of the respective device, for example, a graphical user interface (GUI). The display can include OLED technology, LCD technology, light emitting polymer display technology or other display technology suitable for presenting information to a user in a visual format. According to some embodiments, the display is a conventional display suitable for rendering graphical item that are selected using a mouse and cursor. According to other embodiments, the display includes a touch screen display. According to these embodiments, the display is sensitive/responsive to input selections made by the user contacting the face of the display. Such displays are sometimes referred to as haptic displays. In accordance with further embodiments, the devices 206, 208, 212 can also include one or more additional touch-sensitive surfaces such as a trackpad or touchpad. In various embodiments, the devices 206, 208, 212 can also include additional I/O devices such as a mouse, a physical keyboard, pushbuttons and/or switches that are operable by the user.

According to some embodiments, the display is responsive to multiple touch inputs applied simultaneously to the display by the user. According to these embodiments, the device processes the multiple inputs based on any of the pressure, degree, and/or position of each point of the inputs. These embodiments can allow for a wider range of touch inputs to be employed by the user. According to other embodiments, the devices 206, 208, 212 can include a display in which contact is made using a stylus or other pointing device.

According to some embodiments, the devices 206, 208, 212 respond to voice commands. For example, the microphone can be employed to convert an audio input provided by the user to an electrical signal, for example, to record speech. Further, the speaker(s) can be employed for audio playback of audio recordings/signals.

In general, the devices 206, 208, 212 can display one or more graphical user interfaces in the display included with the device. The graphical user interface provides the user access to various objects (for example, display objects such as icons and pull down menus) and for conveying information to the user. For example, the display objects can include graphic representations of objects employed in a system used for language learning. A non-exhaustive list of examples of these types of objects include device functions such as identifying a target language, identifying a skill level, connecting with partners and entering responses as part of a language learning process. Accordingly, one or a plurality of icons or other graphic objects can be rendered for viewing and/or selection in the display via either a touch input or other input such as a cursor rendered in the display.

In general, the system 200 provides tools and functionality accessed by the mobile devices 206, 208 and the additional device 212 to allow users of the devices to participate in language learning. According to some embodiments, the user employs the mobile devices 206, 208 and the additional device 212 to access and/or download one or more tools from the resources 204 to the device (206, 208, 212) where the tools are employed to allow the user to participate in language learning with other users connected to the network 202. According to some embodiments, the tools are stored in the memory (for example, the memory 207, 213) included in the user devices 206, 208, 212.

According to some embodiments, the tools are provided in an application that the user downloads to the device. For example, the application can be downloaded from the application server 210. According to some embodiments, the application server 210 is hosted by a third party service, for example, in an application store or other digital application distribution platform from which other applications unrelated to the language-learning application can also be accessed and downloaded (well-known current examples include the iOS App Store operated by Apple, the Amazon App store and Google Play). According to other embodiments, the application server 210 is provided by the entity that hosts the services and resources included in the resources 204. For example, in an embodiment where the language learning application is provided as a web application, the application can be provided on a server hosted by the operator of the resources 204. Accordingly, in some embodiments the application server 210 is integrated into the resource 204. In an alternate embodiment, the language learning application is provided on a server hosted by a third party. In further embodiments, the system 200 allows updates to the language learning application and other software to be "pushed" to any of the devices 206, 208, 212 from either or both of the application server 210 and the resources 204.

In various embodiments, the resources 204 are employed by one or more of the end users interested in directly learning language. However, in some embodiments, the resources 204 are employed by enterprise customers, for example, schools, educators and others interested in advancing language education for a particular group including a plurality of end users.

According to various embodiments, the user management module 214 can be employed by a system administrator and/or a third-party enterprise for establishing and managing user accounts for the plurality of users 105. According to a further embodiment, a first enterprise employs the user management module 214 to establish and manage the user accounts employed by a first group of users who are affiliated with the enterprise. In this embodiment, one or more additional enterprise users can establish and manage the user accounts for different groups of users, respectively.

According to some embodiments, the end user settings module 216 can be employed by the users 105 to establish a user account with identification and login credentials specific to the respective user. According to a further embodiment, the end user settings module can be employed by the users 105 to establish payment settings for the respective users. Further, in some embodiments, the end user settings module 216 can be employed to establish user settings and/or user profiles concerning language learning. According to one embodiment, the end user settings module 216 creates a user profile that identifies characteristics of a user's progress and/or preferences in language learning. For example, the settings can identify the target language and skill level of the user in the target language. These settings and/or preferences can be employed to better match the user with other users interested in participating in peer based language learning sessions.

In various embodiments, the system 200 provides language learning tools and resources that employ words that phonetically resemble other words, respectively, in a given language. As described in greater detail herein, the use of these phonetic-pairs can greatly increase the rate-of-learning of both speech and spelling in the target language.

Some embodiments employ one or more of a word library including words associated with a player-level, a plurality of word databases and a word classifier that supports a "wiki" collaborative approach for modifying the word library and/or word databases. The later approach allows language learners (for example, the plurality of users 105) to add words to the word library, for example, to add words to the word database of their native language. According to one embodiment, this approach also provides language learners with an ability to recommend modifications to the word databases of the language that they are currently studying, i.e., a non-native language. Further, language learners can also contribute to vocabulary examples according to some embodiments. These vocabulary examples context to language learning sessions. In addition, according to one embodiment, language learners (i.e., the plurality of users 105) can recommend the addition of new languages.

In some embodiments, the language and word-library builder 218 is employed to construct an overall word library for each language for which the system 200 provides language learning resources. Thus, depending on the embodiment, the language and word-library builder 218 can support a single language or a plurality of languages with custom word-libraries built for each language. In addition, the language and word-library builder 218 operates dynamically in some embodiments to support the wiki-learning model by which users (for example, the plurality of users 105) contribute to the overall word library by contributing words that they've identified as phonetically resembling another word in the same language. In some embodiments, the language and word-library builder 218 receives the words provided by the plurality of users 105 and processes the user-input by screening and classifying the words. Approved words are added to the selected language for use by users at particular skill level.

In some embodiments, the word-deck builder 220 is employed to provide a selected set of words (for example, a set of words that each phonetically resembles another word in a given language) based on information received from the user(s). In general, each word-deck generated by the word-deck builder 220 includes a plurality of words that phonetically resemble another word in a selected language, respectively. In various embodiments, the word-deck builder 220 can build a word-deck based on factors including any one of the following factors, any combination of the following factors, additional factors, or a combination of one or more additional factors and one or more of the following factors: a target language; a skill level of the user(s); a native language of the user(s); the words included in one or more past word-decks employed by the user(s) and a past performance(s) of the user(s) from earlier learning sessions. According to one embodiment, at least some of these factors (or "inputs") are provided by the user(s) to initiate a language learning session or game.

Depending on the embodiment, the word-deck builder 220 can pre-build one or more word-decks for a selected language. For example, the word-deck builder can pre-build a first word-deck for use by beginners learning English, a second word-deck for use by intermediate-level students learning English; and a third word-deck for use by advanced-level students learning English. The immediately preceding approach can assist in allowing students to more quickly begin a language learning session by accelerating the time needed to provide a word-deck to the user(s). According to another embodiment, the word-deck builder 220 generates a word-deck on receipt of a request to initiate a language learning session by a user. According to one embodiment, the word-deck generation is completed in substantially real-time. According to a further embodiment, the word-deck is customized based on information concerning each of the users participating in a particular language learning session.

In various embodiments, language-learning processes provided by the system 200 include elements that provide one or more language-learning games. According to the illustrated embodiment, the game management engine 222 operates to generate and deliver language-learning games or elements thereof to users. According to one embodiment, the game management engine 222 operates to provide timed-learning sessions for a solo user who competes against the clock. According to other embodiments, the game management engine 222 operates to provide timed-learning sessions for teams who compete against one another. According to one embodiment, the preceding includes timed game-play. In further embodiments, the game management engine 222 can keep score of language learning sessions, save results of language learning sessions, initiate new language learning sessions and select peers for team-based language learning sessions based on one or more user preferences or settings. For example, according to some embodiments, the game management engine 222 can automatically match peers for language learning sessions based on the user preferences and/or settings. In addition, the game management engine 222 can offer rewards and/or incentives to users to encourage the users to advance their language skills. These can include, for example, points, stars, badges or icons that are awarded based on a user's achievements and success in one or more language learning sessions.

The system 200 can operate to connect users who are remote from one another. The preceding allows users who may have no prior connection to be introduced to one another and collaborate together to improve their language skills (for example, to collaborate together to learn a common target language). In various embodiments, the social logic engine 224 operates to allow users to share results of their language learning sessions and to encourage others to participate and/or continue to work to improve their language skills. For example, the social logic 224 can allow for the sharing of results of one or more language learning sessions via Facebook, Twitter, the provider of the host application and services 204 and/or other social networks. Thus, depending on the embodiment, the social logic engine 224 can facilitate social media engagement by the plurality of users 105 via social media resources included in the services 204 and/or via services provided by a third-party. According to some embodiments, the social logic engine provides automatic updates about results and/or progress of their friends on the language learning platform provided by the system 200. This information can further motivate users to engage with the language learning platform to advance their language skills.

The capabilities of the system 200 can also allow for a collection of data from users including personal performance, personal progress and indicators of overall performance of the language-learning approaches provided by the system 200 as some examples. In various embodiments, the data analytics module 226 operates to aggregate and process user data to generate statistics that are employed by the operator of the language learning resources 204 to evaluate how to improve user-interest and engagement, to accelerate the language learning by users and to identify other areas for improvement.

According to some embodiments, the one or more databases 228 store user identification information (for example, a user profile including user IDs, passwords, user settings and user preferences), results of language learning sessions, one or more word-libraries and one or more word-decks. Depending on the embodiment, the database 228 can include any of a relational database, object-oriented database, unstructured database, or other database. Further, the database 228 can be included in any aspect of a memory system, such as in RAM, ROM or disc, and may also be separately stored on one or more dedicated data servers included in the resources 204.

Figure 3:
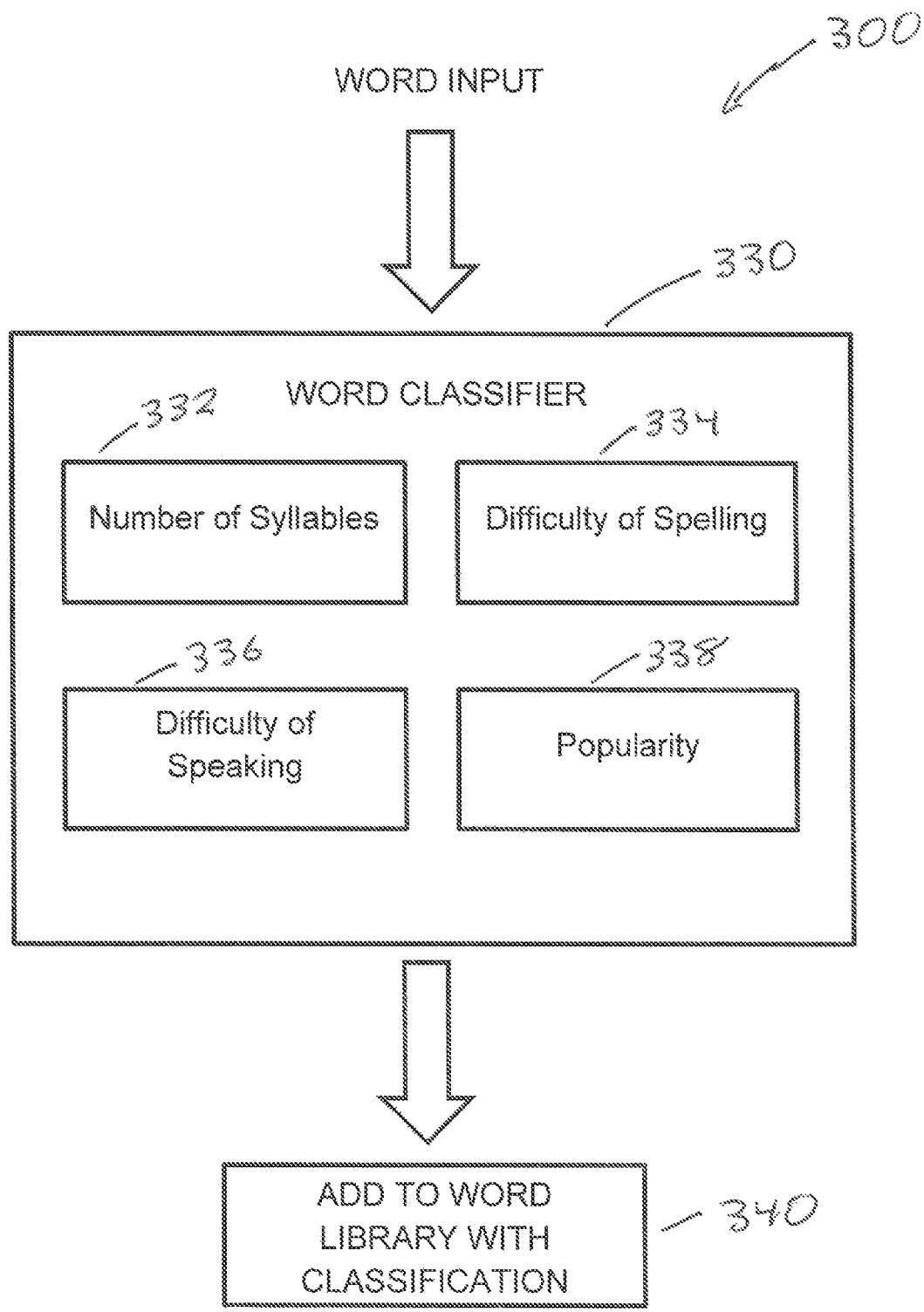
FIG. 3 illustrates a word classifier in accordance with one embodiment.

Referring now to FIG. 3, a system 300 for word classification is illustrated in accordance with some embodiments. The system 300 includes a word classifier 330 that provides a word classification 340 for words that are processed by the word classifier 330. According to some embodiments, the word classifier 330 processes words based on factors that can include the number of syllables in the word, the difficulty of spelling the word, the difficulty of speaking the word and the popularity of the word. As will be apparent to those of ordinary skill in the art, in view of the disclosure provided herein, the word classifier 330 can classify words based on any one of the preceding factors, any combination of the preceding factors, additional factors, or a combination of one or more additional factors and one or more of the preceding factors depending on the embodiment.

According to various embodiments, the word classifier 330 can employ one or more algorithms in a process that determines a skill-level classification for each of the respective words that is processed by the classifier 330. According to the illustrated embodiment, the word classifier 330 includes a first module 332 that evaluates words based on the number of syllables in the word, a second module 334 that evaluates words based on the difficulty of spelling the word, a third module 336 that evaluates words based on the difficulty of speaking the word and a fourth module 338 that evaluates words based on the popularity of the word.

According to some embodiments, the system 300 operates to place words into various classifications that are based on the skill level of users who are learning the language in which the word is found. For example, the classifications can include a beginner level, an intermediate level and an advanced level as one example. According to one embodiment, the first module 332 determines a classification of the word relative to other words in the language based on the number of syllables. For example, the first module 332 can operate based on an assumption that the greater the number of syllables in a word the greater the difficulty for language learners. Further, because the number of categories into which the word can be placed is limited, the first module 332 can also operate using a plurality of ranges where each range is defined by a minimum of number of syllables required for entry in the class. The plurality of ranges can also include a maximum of number of syllables for words to qualify for the class.

According to one embodiment, the word classifier 330 operates to classify words into three categories: beginner, intermediate, advanced. The beginner classification is assigned to words including a minimum of one syllable and a maximum of one syllable. The intermediate classification is assigned to words including a minimum of two syllables to a maximum of three syllables. The advanced classification is assigned to words including a minimum of four syllables and does not include a maximum.

The second module 334 determines a classification of the word relative to other words in the language based on the difficulty of spelling the word. In one embodiment, spelling difficulty is determined based on a grade-level at which the word is introduced into a student's vocabulary in the target language. According to another embodiment, spelling difficulty is determined based on whether or not a word provides an exception to the conventional spelling in the target language. For example, words that require that a user understand the rule "I is before E, except after C, unless it says A as in neighbor and weigh" can be assigned a more advanced classification than those that do not require the understanding of such a rule.

The third module 336 determines a classification of a word relative to other words in the language based on a difficulty of speaking the word, that is, a difficulty in properly pronouncing the word. For example, with the words most difficult to pronounce placed in the advanced classification. English learners from certain countries mispronounce many of the same English words based on the rules and restraints of their specific native tongues. For example, Thai speakers may say "ship" instead of "chip." Brazilians may struggle to differentiate between "three" and "tree." The French may say "keys" when they mean to say "kiss." Thus, in some embodiments, the third module 336 can determine a classification based, at least in part, on a native language of the user.

According to one embodiment, the fourth module 338 determines a classification of a word relative to other words in the target language based on a popularity of the word in the target language. Popularity can, for example, be determined based on a frequency with which a word appears in news articles in the target language. In one version, the fourth module classifies the most popular words in a target language as beginner words.

According to embodiments in which the word classifier 330 includes multiple modules, the word classifier 300 determines an aggregate classification. Thus, if a word is of moderate difficulty to spell but frequently found in the language, the word classifier 330 can place the word in the beginner category because of the word's relative importance rather than in the intermediate category. Conversely, if the word is difficult to spell with a high number of syllables it can be placed in the advanced category by the word classifier 330 even if the word is highly popular.

According to one embodiment, the word classifier 300 operates to classify words into sub-classes. This approach can provide users with a more nuanced or granular tool. For example, in one embodiment, each of a beginner class, an intermediate class and an advanced class include two sub-categories. Thus, the beginner class includes a beginner 1 class and a beginner 2 class. The intermediate class includes an intermediate 1 class and an intermediate 2 class. Similarly, the advanced class includes an advanced 1 class and an advanced 2 class. According to this embodiment, word-decks provided to users can be based on any one of the six available classifications rather than three categories. The preceding can be included in the process employed by any one or any combination of the modules included in the word classifier 330 depending on the embodiment.

According to one embodiment, the word classifier 330 is included in the language and word library builder 218. As described above, some embodiments utilize a "wiki" collaborative approach that allows users to suggest new words for addition to the word library of the target language. According to these embodiments, the word classifier 330 receives a word provided by a user as an input to the classifier 330, processes the word and adds the word to the library with a classification 340. According to another embodiment, the word classifier 330 is included in the word-deck builder 220. According to still another embodiment, the word classifier 330 is included as a separate module in the resources 204.

Figure 4:
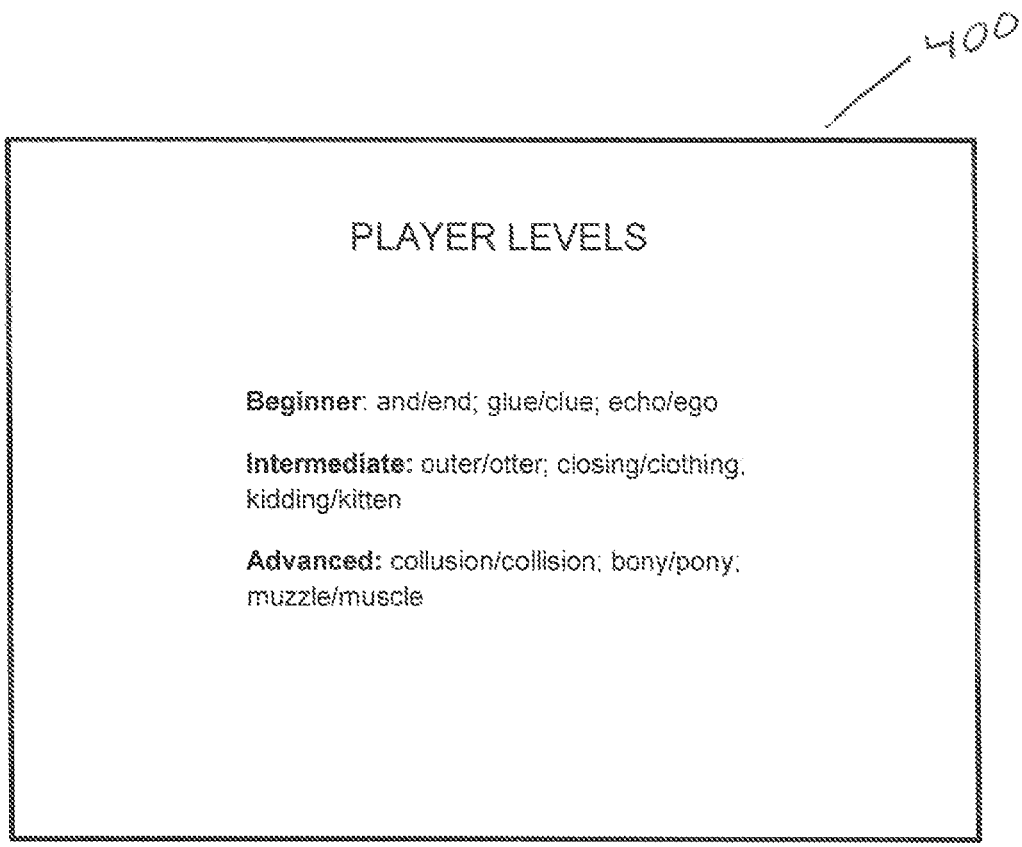
FIG. 4 illustrates words associated with player levels in accordance with one embodiment.

FIG. 4 provides some examples of player-level word classifications 400 that are generated by the word classifier 330 in accordance with one embodiment where English as the target language. According to the illustrated embodiment, the player-level word classifications include a beginner level, an intermediate level and an advanced level. As described above, the systems and methods described herein improve results for users learning a target language by providing users with words that have a phonetic similarity with another word in the target language. Practice based on speaking and spelling these types of words allows users to directly address the most significant challenges that can face a user trying to learn a target language. Thus, each level includes multiple word-pairs that provide examples of the types of words included in the word library for the respective skill level in the target language.

In FIG. 4, the beginner level includes the words: and, end, glue, clue, echo, and ego. The intermediate level includes the words: outer, otter, closing clothing, kidding and kitten. The advanced level includes the words: collusion, collision, bony, pony, muzzle and muscle. According to some embodiments, both words of each phonetic-pair are included in the word library for a selected target language. According to a further embodiment, both words of each phonetic-pair are included in a word-deck for the selected skill level in the target language. These embodiments provide a larger set of words in the word library. However, it is not necessary to include each word of the phonetic pair. That is, a first word of a phonetic-pair challenges the user because of the phonetic similarity with a second word in the phonetic-pair due to the existence of second word in the target language regardless of whether the second word is included in the word library or a given word-deck. Thus, the approaches described herein employ a language learning methodology that can be described as learning by "recognition through differentiation." That is, users learn words in the target language by comparison with other words in the target language. According to the embodiments described herein, these approaches do not rely on context provided by images (for example, an image of an apple to represent the word "apple"). Some of the approaches described herein also do not rely on context provided by the use of the words in a sentence.

According to some embodiments, the language and word library builder 218 screens words that are provided to it to avoid an addition of homonyms to the word library. For example, the words "do" and "due" have the same sound as one another but a different meaning. The words "to," "too" and "two" provide another example. Such phonetic-pairs or triplets are not included in the approaches described herein because the associated words cannot be differentiated from one another when pronounced correctly.

Figure 5A:
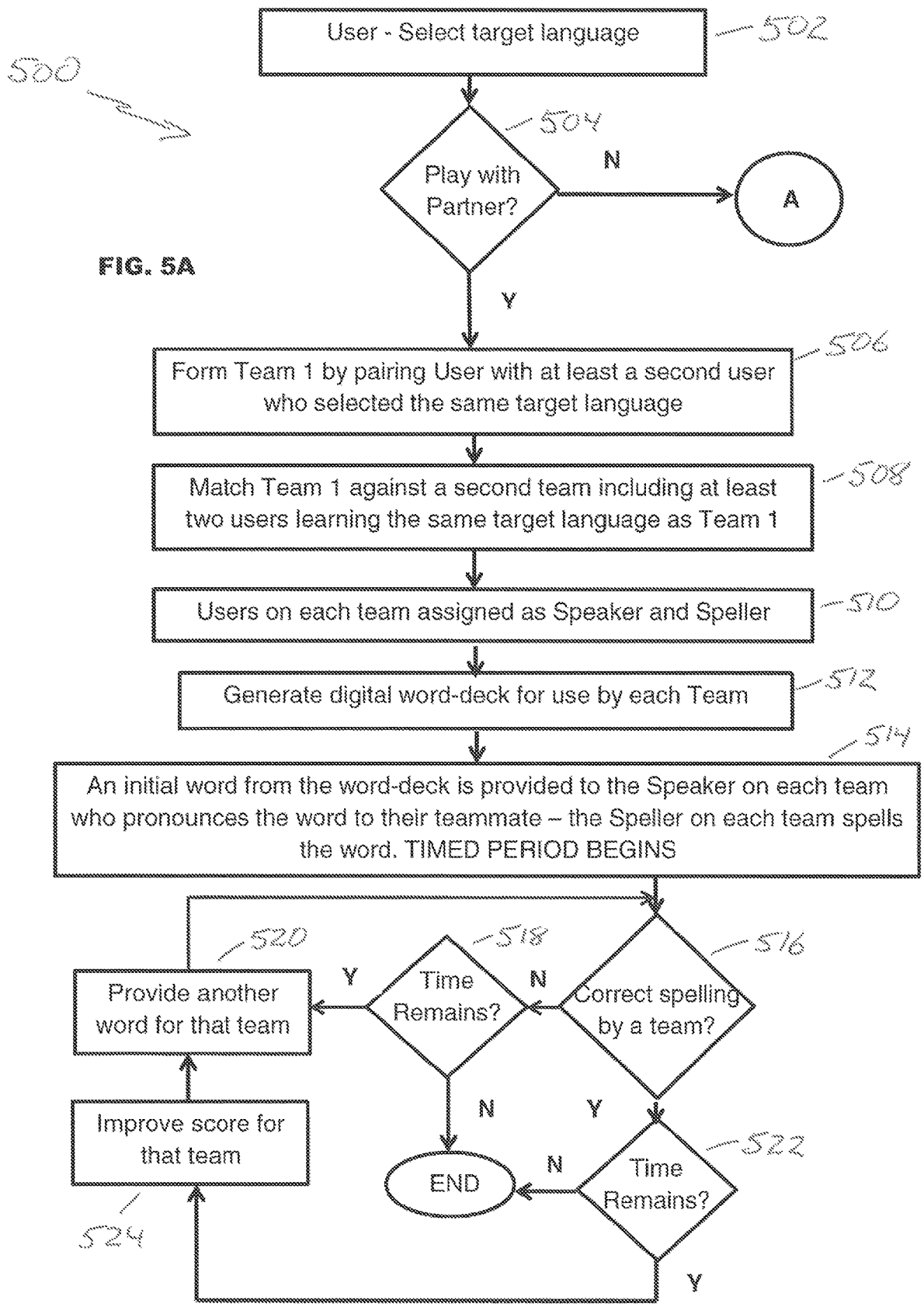
FIGS. 5A-5B illustrate a flow diagram of a process for language learning in accordance with one embodiment.
Figure 5B:
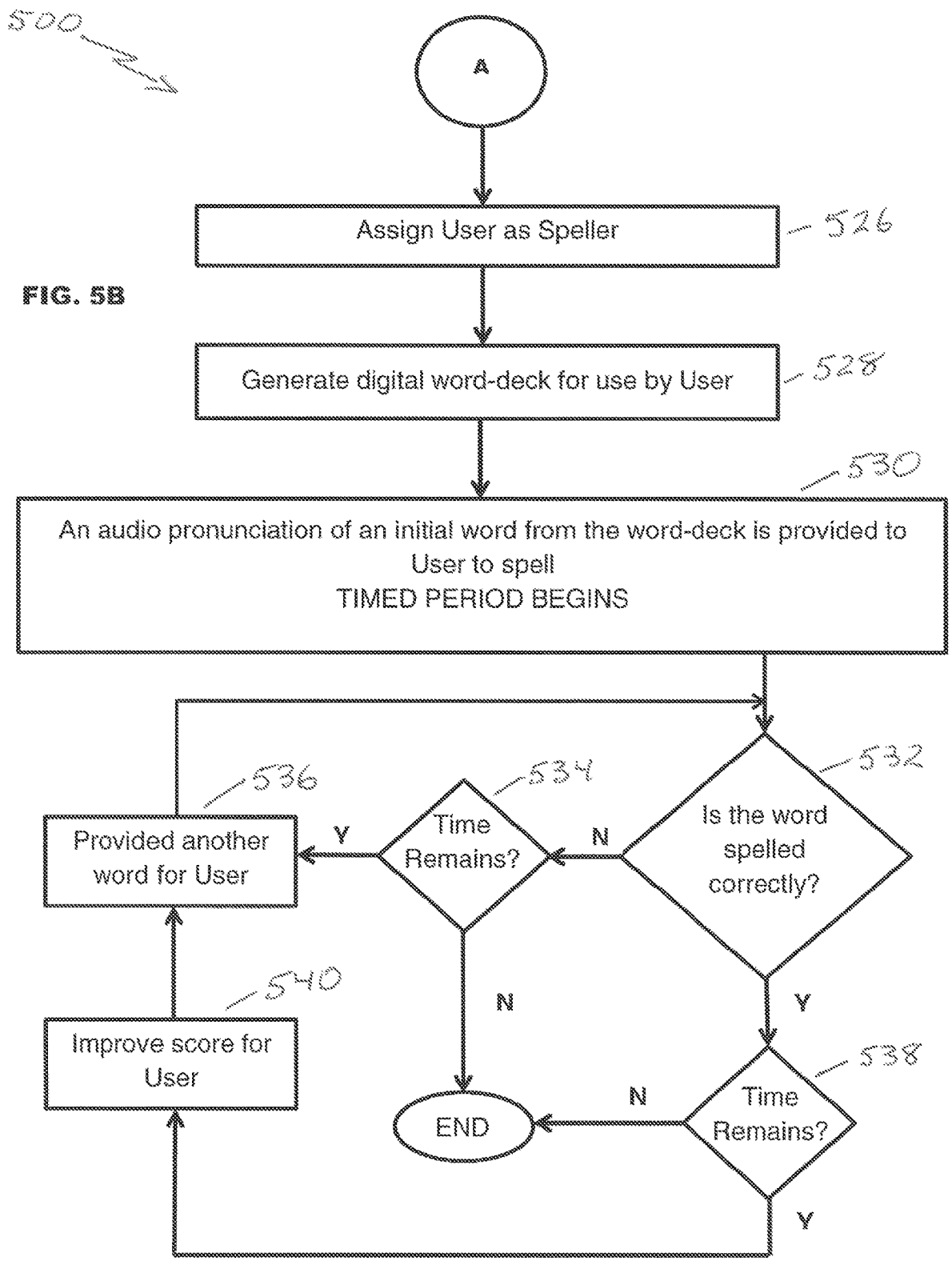

Referring now to FIGS. 5A and 5B a flow diagram of a process 500 for language learning is illustrated in accordance with various embodiments. According to some embodiments, the process 500 is employed with the system 200. These embodiments can include language-learning games that include timed-competition. According to the illustrated embodiment, the process 500 can be employed by a user for solo game-play or group game-play. Further, the process 500 is implemented with an application accessible to each of the users, for example, via the user devices 206, 208, 212 illustrated in FIG. 2. The application allows the users to employ the resources 204 to engage in the language-learning approaches described herein.

Referring to the embodiment illustrated in FIG. 5A, the process 500 includes an act of selecting a target language 502, an act of determining whether a player is playing as part of a team 504, an act of forming a first team 506, an act of matching a first team against a second team 508, an act of assigning the speaking and spelling roles 510, an act of generating a digital word-deck 512, an act of providing an initial word 514, an act of determining whether a word is spelled correctly 516, a first act of determining whether any time remains 518, an act of providing another word 520, a second act of determining whether any time remains 522 and an act of improving a score for a team 524.

At the act of selecting a target language 502, the user identifies a language they wish to learn. According to one embodiment, the system 200 supports multiple languages such that the user has multiple options from which to select. Referring to FIG. 2, for example, the system 200 can provide the resources 204 with a language and word library builder 218 that supports a plurality of languages.

At the act of determining whether a player is playing as part of a team 504, the user decides whether they wish to play a language-learning game solo (for example, against the clock) or with another user (for example, a teammate). If the user elects to play with another user the process moves to the act 506. According to one embodiment, at act 504 the user can also decide whether to play as the speaker on a team or as the speller. The user can also leave the determination of their role open until later in the process 500. If the user elects to play solo the process 500 moves to the acts illustrated in FIG. 5B and described below.

At the act of forming a first team 506, a team is formed with the user and a partner, i.e., a first team "Team 1" is formed. According to some embodiments, the user is presented with a set of individuals known to them from which to choose a teammate. According to another embodiment, the user is provided with a list of users who are currently on-line and/or have the language learning application open on their user device, for example, users with the language learning application open on one or more of the user devices 206, 208, 212 illustrated in FIG. 2. In either embodiment, the user is provided with the capability to select an identified user and invite them to play a language learning game in a target language. According to one embodiment, users can agree to share information from their user profile with other users. According to this embodiment, users can review the user profiles to identify others who have one or more characteristics desired of a playing-partner (for example, they are at the same skill level in the target language). In one embodiment, the social logic engine 224 provides the tools and resources necessary to accomplish the preceding.

At the act of matching the first team against the second team 508, a second pair of users is selected to play the language learning game with the first team of users. Here too, the first team can invite others selected from a list of individuals known to them or other users who are currently on-line and/or have the language learning application open on their user device. According to another embodiment, the system 200 employs the resources 204 to provide an auto matching of Team 1 with a second team "Team 2" who are: 1) available; 2) interested in learning the same target language; and 3) at the same or substantially similar skill level. According to this embodiment, information included in known user profiles is automatically screened to identify suitable team members from among the other users.

At the act of assigning the speaking and spelling roles 510, a first member from each of the two teams is selected as a speaker and a second member from each team is selected a speller. The speaking and spelling roles can be self-determined by the respective team members. For example, the selection can be made by the first user at the act 504. That selection then determines the roles for Team 1. However, where the first user has left the choice open, the two team-members can make the decision at the act 510. The two users on Team 2 can make a similar determination. In an alternate embodiment, the system 200 can employ the resources 204 to automatically assign the speaking and selling roles at act 510.

At the act of generating a digital word-deck 512, the word-deck builder 220 included in the resources 204 generates a word-deck for use by the two teams. Generation of the word-deck can include consideration of the following factors either alone, in combination with one another, based on other factors, or based on other factors in combination with one or more of the following factors: target language, skill level, past word-decks provided to one or more of the users participating in the current game-play and past performance of one or more users participating in the current game-play.

At the act of providing an initial word 514, the speaker on each team is provided with a word from the word-deck. The speaker's role is to pronounce the word accurately to provide their teammate with the best possibility of spelling the word correctly. Audio of the pronunciation is provided to the speller on the team, for example, the audio is communicated from the speaker's user device (for example, one of the user devices 206, 208, 212) to the speller's user (also provided by one of the user devices 206, 208, 212) via the network 202. The speller on the team enters the spelling and submits the entry. In some embodiments, each session is played for a set amount of time and a team's success is determined based on the number of words that are spelled correctly. In one embodiment, the team that has the greatest number of words that are spelled correctly wins that timed session. Thus, the act 514 can also include an initiation of a timer and the start of the timed session in accordance with some embodiments.

As described below, the process of providing a word for pronunciation by the speaker and spelling by the speller on each team is repeated until the timed session ends with the teams' scores updated with successful entries. Also, the speller on the team can request that the speaker repeat a word if the speller is unclear about the word as initially spoken by the speaker on the team. According to one embodiment, the speller can receive multiple repetitions of the spoken word at their request.

The system 200 illustrated in FIG. 2 and the process 500 support a communication of audio of the spoken-word in one or more different formats depending on the embodiment. In some embodiments, audio of the word is recorded and then communicated to the speller. The preceding can occur in substantially real-time in some embodiments. That is, the recording and communication can be completed with no discernible delay apparent to the users. In other embodiments, the speaker and the speller have a live audio connection. In these embodiments, the audio signal is directly transmitted to the speller in substantially real-time as the speaker states the word. According to one embodiment, the speaker and the speller communicate via a live video link including audio. This embodiment allows players to see each other during game-play even where they are in different geographic locations.

The system 200 illustrated in FIG. 2 and the process 500 can also support an entry of the spelling of the spoken-word in one or more different formats depending on the embodiment. According to one embodiment, the user device 206, 208, 212 includes a keyboard and the speller provides a typed entry which is then evaluated for accuracy as described below with reference to the act 516. According to another embodiment, the user device 206, 208, 212 includes a virtual keypad rendered in a touch screen display, for example, the display 205. In this embodiment, the spelling is an entry typed using the virtual keypad. According to still another embodiment, the user device 206, 208, 212 includes voice recognition and the entry is generated as the speller speaks the word, for example, letter-by-letter. In any of these embodiments, the entry provided by the speller is evaluated for accuracy. For example, in one embodiment, the entry is communicated to the resources 204 via the network 202 to determine whether the word is spelled accurately.

At the act of determining whether a word is spelled correctly 516, the accuracy of the spelling is determined by comparing the spelling entered by the speller with the correct spelling of the word provided to the speaker. The preceding is performed for each entry provided by each team during a timed period of game-play. Thus, the acts 516, 518, 520, 522 and 524 occur independently for each team during the timed-period.

If it is determined that the word is not spelled correctly by a team at act 516, the process moves to the first act of determining whether any time remains 518 before providing the next word to the team. Provided that time remains in the game-playing session, the process moves the act of providing another word 520 to the team. Following an entry of the new word by the team, the process 500 returns to the act of determining whether the new word is spelled correctly 516.

Because the timer runs continuously throughout game play, at any iteration in which a word is found to be spelled correctly at the act 516, the process 500 moves to the second act of determining whether any time remains 522. At act 522, the status of the timer is checked to confirm whether game-play remains open. If time does remain, the process 500 moves to act of improving the score for the team 524 followed by the act of providing another word 520 to the team. Depending on the embodiment, scoring can be tabulated in any of a number of ways. For example, a team's score can increase with each accurate spelling. Further, the amount that a score increases can vary depending on a degree of difficulty of the word. Thus, words can be weighted such that those considered advanced provide the greatest increase in score when spelled correctly and those considered beginner words provide the lowest increase in score when spelled correctly.

According to the illustrated embodiment, the process 500 ends if time does not remain when checked at either of the acts 518 and 522. In addition, the process 500 can end automatically when time expires regardless of whether either team has an entry pending at the act of determining whether a word is spelled correctly 516.

Referring now to FIG. 5B, a portion of the process 500 is illustrated in which a player opts to play solo based on the input they provide at the act of determining whether a player is playing as part of a team 504. According to the embodiment illustrated in FIG. 5B, the process 500 includes an act of assigning the user as a speller 526, an act of generating a word-deck 528, an act of providing an audio pronunciation to the user 530, an act of determining whether a word is spelled correctly 532, a third act of determining whether any time remains 534, an act of providing another word 536, a fourth act of determining whether any time remains 538 and an act of improving a score for the user 540.

When a user opts to play the language-learning game solo, the process 500 moves to the act of assigning the user as a speller 526. That is, during solo game-play pre-recorded audio of each word is provided to the user and the user enters a spelling of each word. With the user assigned as the speller, the process 500 moves to the act of generating a digital word-deck 528. Here too, the word-deck builder 220 included in the resources 204 generates the word-deck used for solo game-play. Generation of the word-deck can include consideration of the following factors either alone, in combination with one another, based on other factors, or with other factors in combination with one or more of the following factors: target language, the user's skill level, past word-decks provided to the user and the past performance of the user.

The process then moves to the act of providing an initial word 530. Here, a "robot" player provides the pre-recorded audio of the spoken-word. Audio of the pronunciation is provided to the user, for example, the audio is stored at the resources 204 and communicated to the user's device (one of the user devices 206, 208, 212) via the network 202. According to these embodiments, game-play does not require communication with other users. Thus, in one embodiment, an application stored on the user's device (for example, the user device 206, 208, 212) operates to provide the pre-recorded audio without need to access resources over the network 202. That is, a user can play solo while "off-line" provided that the application including the necessary resources are stored on the user's device. According to various embodiments, an application stored on the user's device can include any one of or any combination of pre-set word-decks for respective skill levels: a word-deck builder for real-time word-deck generation; pre-recorded audio of words included in a word-library and/or word-deck; and a game management engine to facilitate off-line solo language learning sessions.

According to the illustrated embodiment, the user enters the spelling and submits the entry. In some embodiments, a session is played for a set amount of time and the user's success is determined based on the number of words that are spelled correctly. Thus, the act 530 can also include an initiation of a timer and the start of the timed session in accordance with some embodiments. On completion of a session, the user can evaluate their success by comparing their current score to their past score(s) or to the scores of other users. Further, a user can track progress over time by comparing a skill-level at which each of their games is played.

At the act of determining whether a word is spelled correctly 532, the accuracy of the spelling is determined by comparing the spelling entered by the speller with the correct spelling of the word provided to the user in audio form. The preceding is performed for each entry provided by the user during a timed period of game-play. Thus, the acts 532, 534, 536, 538 and 540 can be repeated multiple times during the timed-period.

If it is determined that the word is not spelled correctly at the act 532, the process moves to the third act of determining whether any time remains 534. Provided that time remains in the game-playing session, the process moves the act of providing another word 536 to the user. The user enters a spelling of the new word and the process 500 returns to the act of determining whether the new word is spelled correctly 532.

At any iteration in which a word is found to be spelled correctly at the act 532, the process 500 moves to the fourth act of determining whether any time remains 538. At the act 538, the status of the timer is checked to confirm whether game-play remains open. If time does remain, the process moves to act of improving the score for the user 540 followed by the act of providing another word 536 to the user. Depending on the embodiment, scoring can be tabulated in any of a number of ways. For example, the user's score can increase with each accurate spelling. During solo game play the amount that a score increases can also vary depending on a degree of difficulty of the word as described above with reference to team play.

According to the illustrated embodiment, the process 500 for solo game-play ends if time does not remain when checked at either of the acts 534 and 538. In addition, the process 500 can end automatically when time expires regardless of whether the user has an entry pending at the act of determining whether a word is spelled correctly 532.

Referring now to FIG. 6, a user interface 600 for a selection of user-settings is illustrated in accordance with one embodiment. For example, the settings can be established by the user at a start of a language learning session. In the illustrated embodiment, the user interface 600 includes a header 641, a first pull down menu 642, a second pull down menu 644 and a third pull down menu 646. The user interface 600 also includes a control element 648. Each of the pull down menus is associated with a label to provide the user with an understanding of the contents of the menu. In FIG. 6 these appear as a first label 643 associated with the first pull down menu 644, a second label 645 associated with the second pull down menu 644 and a third label 647 associated with the third pull down menu 646.

The pull down menus 642, 644, 646 are operable in two states including an active state when selected by the user and an inactive state. In FIG. 6, each of the first pull down menu 642 and the second pull down menu 644 are shown in an inactive state. The third pull down menu 646 is shown in an active state. When selected the pull down menus expand to show multiple items included in the menu.

In the illustrated embodiment, the graphical element that provides the pull down menu also displays a menu item. For example, the first pull down menu 642 provides a menu for selecting a language for the session(s). While the menu can include any number of languages supported by the system 200 and resources 204 of FIG. 2, a single language "English" is displayed. Thus, English is displayed with one or more additional languages when the first pull down menu 642 is expanded.

According to the illustrated embodiment, the header 641 provides the user with an indication of the function of the screen that is displayed. For example, in FIG. 6 the header indicates that the user is on the "Settings" screen. Further, in this embodiment, the Settings screen allows the user to select a target language, a skill level and a competition type. When established by the user, these settings can be employed for one or more language learning sessions. According to one embodiment, the settings selected by the user are established as default settings for the user until the user makes a change.

In various embodiments, the language learning provided by the system 200 can support learning multiple different languages. Further, as mentioned above, where a wiki-model is employed users can contribute to an addition of new languages by identifying words in the language that are phonetically similar to another word in the language. Thus, an activation of the first pulldown menu 642 provides users with a list of target languages available for learning session(s). That is, those languages supported by the language and word-library builder 218 and the word-deck builder 220. The user selects the desired language from those listed in the pull down menu.

As mentioned above, the system 200 can support language-learning lessons for users at different skill levels. Thus, in the illustrated embodiment, the user activates the second pulldown menu 644 to expand it for a list of available skill levels, for example, beginner, intermediate and advanced. The user selects the desired skill level from those listed in the pull down menu.

As described in greater detail with reference to FIGS. 5A and 5B, the system 200 can also support language-learning sessions that users can play either solo or with a partner. Further, according to some embodiments, the user can elect to play with a partner with the user in the role of the speaker or in the role of the speller. Alternatively, the user can elect to have their role assigned to them. As illustrated, the third pull down menu 646 displays each of the preceding options. When activated, the third pull down menu 646 includes a plurality of menu items 650 including a first menu item "Play as Speaker", a second menu item "Play as Speller," a third menu item "Play as Either" and a fourth menu item "Play Solo." When the user selects a specific menu item, the pull down menu returns to an inactive state and displays the menu item selected by the user. For example, if the user selects Play Solo from the third pull down menu 646, the menu will display only Play Solo as the competition type.

When the user has employed the pull down menus 642, 644, 646 to establish the desired settings for a language learning session, the pull downs each display the single menu item that is selected. The user then selects the control element 648 to begin the language learning session with the selected settings. According to some embodiments, the end user settings module 216 operates to add one or more of the selected settings to the user's profile.

Figure 7:
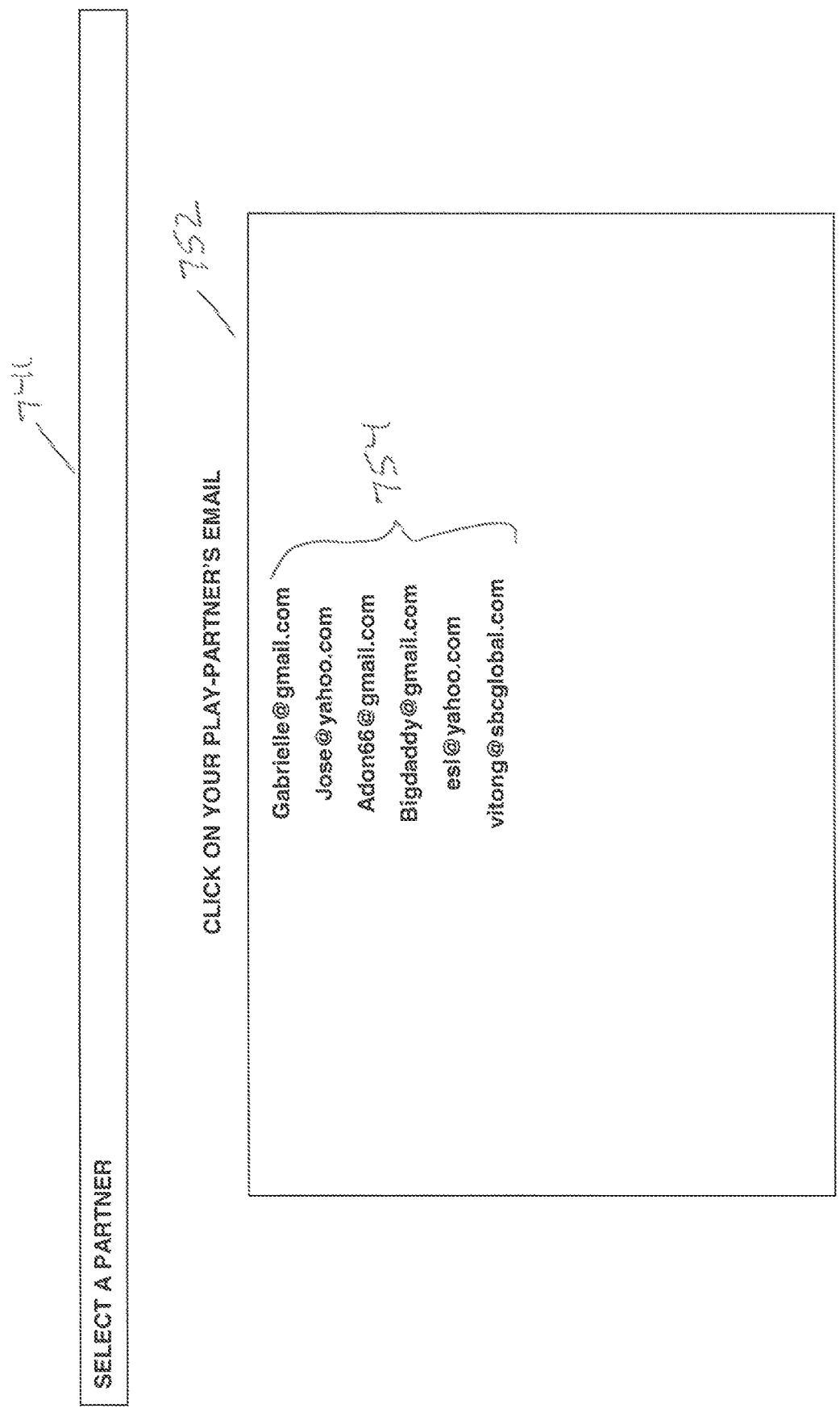

Referring now to FIG. 7, a user interface 700 for a selection of a playing partner is illustrated in accordance with one embodiment. A user can employ the user interface 700 to identify individuals for team play when they elect to play with a partner, for example, via the third pull down menu 646 of FIG. 6. In the illustrated embodiment, the user interface 700 includes a header 741 and a listing 752 including a plurality of users 754. The header 741 identifies the functionality of the page and reads "Select a Partner." The plurality of users 754 provided in the listing 752 can be established based on any of a variety of approaches depending on the embodiment. For example, the plurality of users 754 may be selected for display because they are associated with the user either via a connection made on the language learning platform or a third-party platform (e.g., their friends from Facebook). According to other embodiments, the plurality of users 754 provided in the listing 752 can be selected for display because they are currently "on-line" and/or because they are logged into their user account in the language learning platform. Further, the plurality of users can be selected because they have one or more of the same preferences found in their user settings. For example, the default values associated with their user profile can include their target language, their primary language and their skill level. According to one embodiment, the listing 752 includes only those users who share at least one of the same preferences, respectively, as the user. According to another embodiment, the listing 752 includes only those users who have at least two of the same preferences, respectively, as the user (for example, they share the same target language and the same skill level).

According to the illustrated embodiment, the user selects one of the plurality of users 754 from the listing 752 to form a team for a language learning session. According to one embodiment, a selection of one of the plurality of users generates an invitation and/or alert electronically delivered to the selected user (for example, to the user's device 206, 208, 212) via the network 202. A team is formed when a selected user accepts the invite to join the first user in a language learning session.

Figure 8:
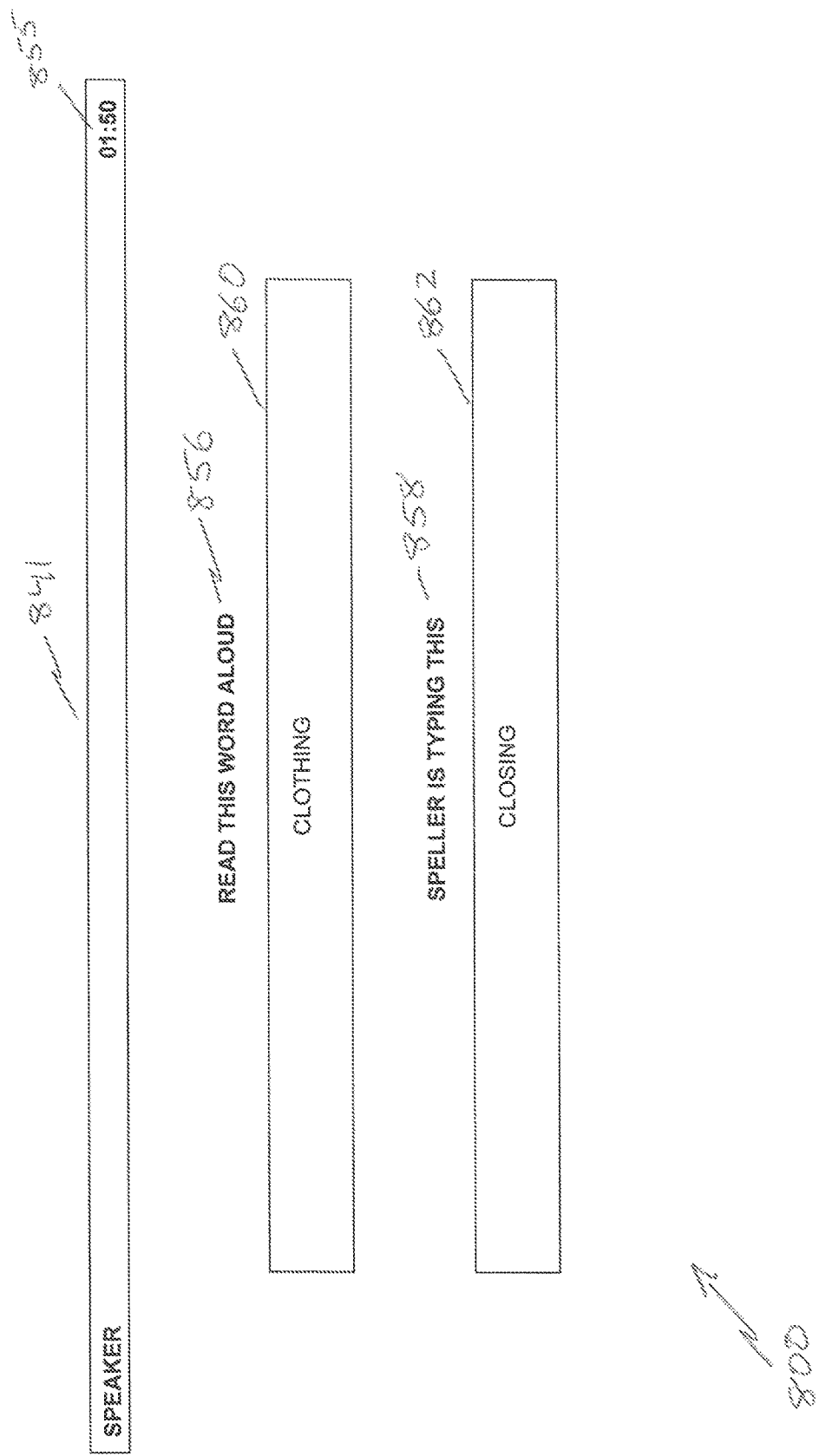

Referring now to FIG. 8, a user interface 800 displayed to a user in the role of the speaker is illustrated in accordance with one embodiment. The user interface 800 is employed to receive each word that the user speaks. In the illustrated embodiment, the user interface 800 includes a header 841, a first label 856, a second label 858, a first field 860 and a second field 862.

The header 841 identifies a role of the user, "Speaker." The header 841 also includes a timer 855. The timer 855 can be employed to provide a countdown of the time remaining when players compete in language learning sessions that have a fixed duration.

The first label 856 identifies the context for the information provided in the first field 860. In the illustrated embodiment, the first label 856 "Read This Word Aloud" provides the user-speaker with instructions on how to participate in the language learning session. This can be employed in the process 500 illustrated in FIGS. 5A and 5B, for example, at the act 514. Similarly, the second label 858 provides context regarding the information appearing in the second field 862. In the illustrated embodiment, the second label 858 "Speller is Typing This" describes that the origin of the text that appears in the second field 862. According to the illustrated embodiment, the text provides the speaker-user with feedback that can assist the speaker in better understanding how effectively their spoken input is understood by the speller. Further, the preceding is provided in substantially real-time.

Figure 9:
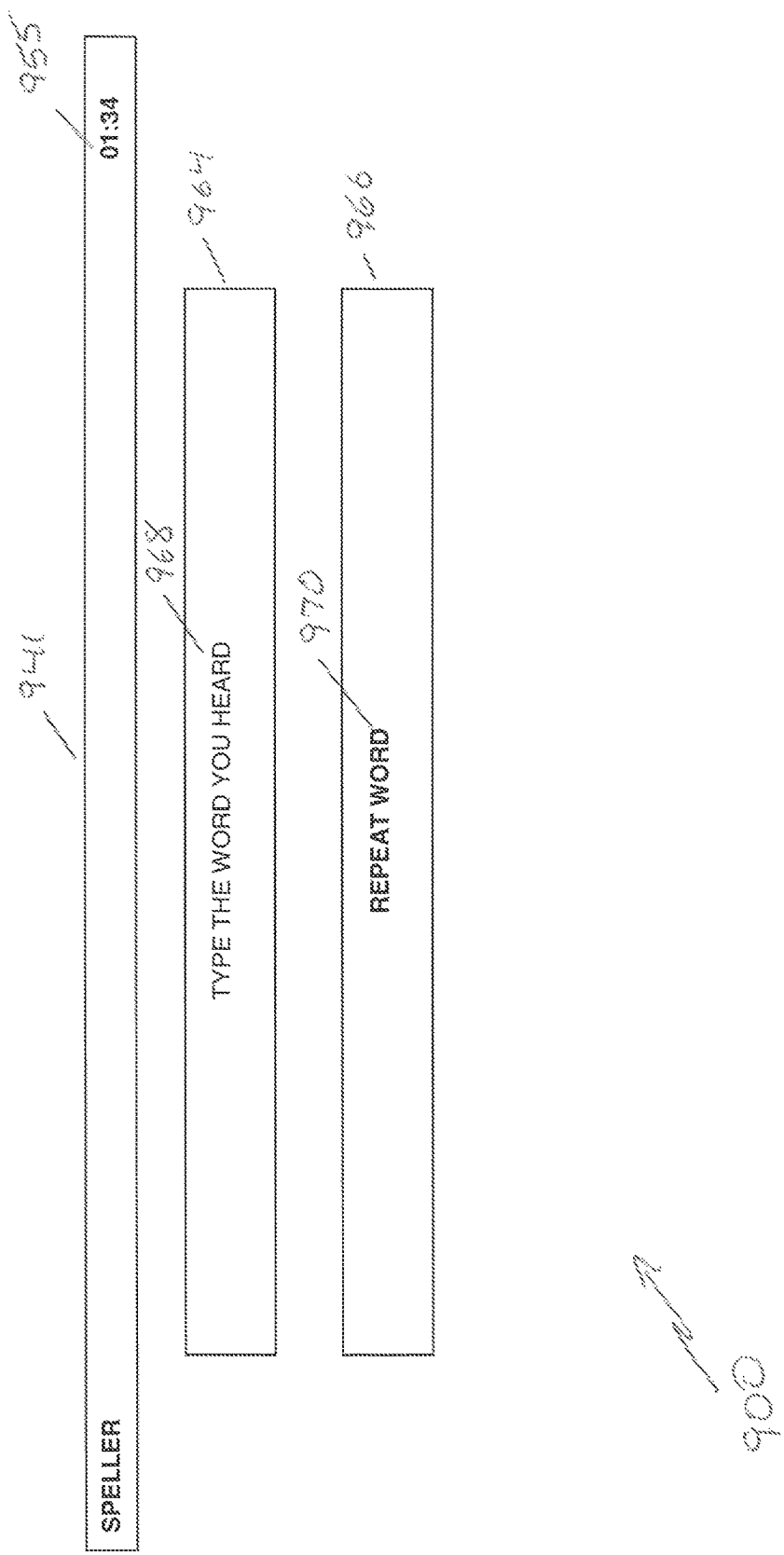

Referring now to FIG. 9, a user interface 900 displayed to a playing partner in the role of the speller is illustrated in accordance with one embodiment. The user interface 900 is employed to receive the spelling entries that are provided by the speller during a language learning session. According to some embodiments, the user interface 900 is also suitable for use in receiving spelling entries in solo language learning sessions. In the illustrated embodiment, the user interface 900 includes a header 941, a text-entry field 964 and a control element 966. The text entry 964 includes a user instruction 968. The control element 966 includes a label 970. In the illustrated embodiment, the user instruction 968 indicates to the user "Type the Word You Heard." The label 970 on the control element 966 states "Repeat Word." The header 941 includes a timer 955 that displays the time remaining in the current language learning session.

During a language learning session, the speller on the team receives an audio output (for example, played over speakers included in the user device 206, 208, 212) of the word they are to spell as spoken by their teammate. The speller enters their spelling in the text-entry field 964. For example, the user can locate their cursor in the field and type the entry. According to another embodiment, where a touch screen display is employed, the speller can touch the region of the screen that displays the text-entry field 964 and then enter the spelling with a virtual keyboard rendered in the display. The text entered in the field 964 by the speller replaces the user instruction 968. According to some embodiments, the text also appears in the second field 862 which is displayed to the speaker in the user interface 800 illustrated in FIG. 8.

If the speller is not sure that they understand the word based on the audio that is played back to them, they can select the control element 966. The speaker on the team is notified via their user device when the speller selects the control element 966. In response, the speaker repeats the word into their user device (for example, the user device 206, 208 or 212). The audio signal is communicated to the user device employed by the speller (for example, the user device 206, 208 or 212) where the word as pronounced by the speaker is played for the speller. The speller can repeat the request to hear the word again as needed to improve their understanding. Provided that the timer 955 has time remaining in the session when the speller enters the word, the user interfaces 800 and 900, respectively, are refreshed for a new word. The process is repeated so long as time remains, with the speaker speaking the word, the speller listening to audio of the pronunciation and then spelling the word.

Figure 10:
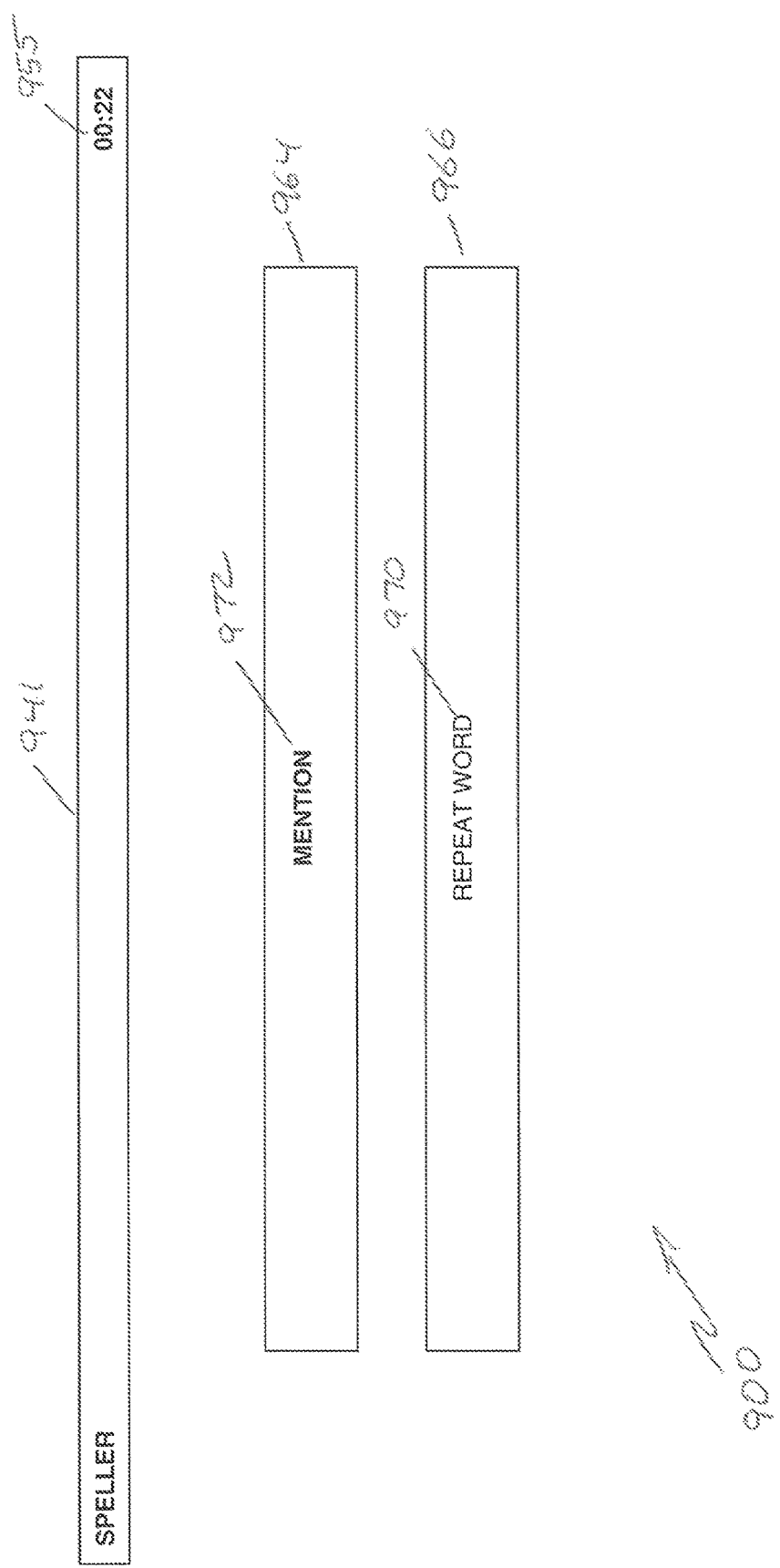

Referring now to FIG. 10, the user interface 900 of FIG. 9 is illustrated after time has elapsed and the speller has completed spelling a word based on an audio pronunciation of the word. Accordingly, the timer 955 indicates that twenty-two seconds remain in the language learning session. In FIG. 10, a spelling entry 972 provided by the speller appears in the text entry field 964. At this point the speller is ready to submit the entry for scoring in the language learning session to a playing partner in the role of the speller is illustrated in accordance with one embodiment.

Referring now to FIG. 11, a user interface 1100 displayed on completion of a language learning session is illustrated in accordance with one embodiment, for example, to provide a summary of results and a score for a language learning session. According to one embodiment, the user interface 1100 is displayed to all members of the team, for example, to each of the speaker and the speller. In the illustrated embodiment, the user interface 1100 includes a header 1141, a scoring summary 1173, a scoring breakdown 1174 and a control element 1178. According to the illustrated embodiment, the scoring breakdown 1174 includes a word-score 1176, a word-list 1180 and a list of entries 1182. The header 1141 identifies the function of the user interface 1100 as displaying "Results."

In one embodiment, the scoring summary 1173 is presented in a phrase that states the team's score for the language learning session along with the total score possible for the session. Here, the phrase reads "You Scored 2 Out of a Possible 6 Points." The word-score 1176 provides a breakdown of the score by word. In the example provided in FIG. 11, three words were presented and one of the three words is correctly spelled by the team. The result is 2 points awarded for the word "Better" that is correctly spelled. According to the illustrated embodiment, the word-list 1180 is presented as a first column and the list of entries 1182 is presented as a second column adjacent the first column. Here, the two lists 1180, 1182 include a misspelling of "Clothing" and "Mansion" in addition to the correct spelling of "Better." In various embodiments, the control element 1178 provides the user with a way to return to a "Home" page within the application. In the illustrated embodiment, the control element 1178 "Return to Settings Page" provides the user with a way to exit the user interface 1100 and return to the settings page (for example, the user interface 600) where they can begin another language learning session. According to other embodiments, the control element 1178 initiates another language learning session for the same two users when the control element 1178 is selected.

Referring now to FIG. 12, a user interface 1200 is illustrated in accordance with one embodiment, for example, to provide the users with context for the words used in the preceding language learning session. According to one embodiment, the user interface 1200 is displayed to all members of the team, for example, to each of the speaker and the speller. In the illustrated embodiment, the user interface 1200 includes a plurality of sentences 1284. The sentences each include a respective one of the words included in the word-list for the preceding language learning session (for example, the word-list 1180 illustrated in FIG. 11). Also included in each sentence is a word that phonetically resembles the word from the word-list that appears in the sentence. This approach employs each word of a selected phonetic-pair in context together in the same sentence.

According to various embodiments, FIGS. 6-12 illustrate user interfaces that are rendered in the user devices 206, 208, 212. For example, FIGS. 6-12 illustrate user interfaces rendered in a graphical user interface displayed by the user devices.

As will be apparent to those of ordinary skill in the art in view of the disclosure provided herein, the processes described herein can be performed with acts performed in a different order, with some acts separated into multiple distinct steps or with one or more acts combined into fewer step(s). For example, referring to the process 500 illustrated in FIGS. 5A and 5B, the act of assigning speaking and spelling roles 510 can performed as a part of the act of matching a first team against a second team 508. As another example, the act of providing an initial word 514 can be separated into multiple different steps including an act of providing the word, an act of speaking the word and an act of entering a spelling of the word. Further, in some embodiments, one or more acts may be eliminated and one or more new acts may be added provided that the resulting language learning process provides students with an opportunity to learn the language based on spelling words that they hear spoken in a target language, in particular, words that are phonetically similar to other words in the target language. As used herein, "spoken" can include: hearing someone speak in person; live audio of human speech; a playback of an audio recording of human speech; and a playback of robot-speech, i.e., electronically generated artificial speech.

In general, users are students interested in learning a second language. As used herein, the term "students" refers to the fact that users are working to improve their language skills. The preceding does not require that the user participate in any structured educational system. Thus, for example, the users can independently employ the systems described herein and participate in the methods described herein without the involvement of any educators or a formal educational system. However, in some embodiments, one or more of the users can be an educator who is employing the methods described herein to assist their student. For example, the educator may employ the process described with reference to FIG. 5 with the educator in the role of a speaker and their student in the role of the speller.

The systems and method described herein are suitable for web applications or mobile application. In accordance with various embodiments, the user devices 206, 208, 212 are computing devices that include a processor (not illustrated) and one or more programs stored in the memory 207, 213 or on some other computer readable medium. In these embodiments, the program may include instructions that when executed on the processor perform various acts involved in any one of or any combination of: initiating a language learning session; identifying users for participation in the language learning session; generating a word-deck including words that are phonetically similar to other words in the target language of the session; providing words from the word-deck for pronunciation by speaker-users; communicating audio of the pronunciation to speller-users; receiving an entry provided by the speller; determining an accuracy of the spelling; maintaining a timer to limit the duration of the language learning session; and providing results of the language learning session to the participants.

Although the description included herein primarily refers to a timed competition between two pairs of students it will also be apparent to those of ordinary skill in the art in view of the description that the approaches described herein are also suitable for other student groupings including students playing against a programmed system (e.g., a "robot"). Further those of ordinary skill in the art will also recognize in view of the description herein that the timed game play can also be played with team members located in the same physical space. For example, a word-deck can be provided in the form of playing cards, each of which contains a word that phonetically resembles another word in the target language. According to this embodiment, the speaker draws a word from the physical word-deck and pronounces it to the speller. The speller then writes the word down. The process is repeated for a timed-period. The students and/or an instructor may then review the list of words as spelled by the speller for comparison with the correct spelling of the respective words.

Although illustrated and described with reference to learning a second language the approaches described herein can be employed by a user to assist in learning a native language. For example, the process illustrated in FIGS. 5A and 5B can be employed by one or more users who find a need to improve their understanding of their native language.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer implemented method for peer-to-peer learning of a language by a plurality of students, each of the students located geographically remote from one another, the method comprising:
   (a) establishing a word library including a plurality of sub-libraries each of the sub-libraries including a set of words in a target language that are organized together based on their relevance to a selected skill level in the target language, respectively, each word selected for inclusion in the word-library because the word forms a word-pair with another word in the target language, respectively, the word-pair formed because of a phonetic similarity between each of the two respective words in the target language;
   (b) providing remote access over a communication network to a database including the word library to each of the plurality of students;
   (c) automatically tracking performance in peer-to-peer learning sessions to establish a level of achievement for each of the plurality of students, respectively, and storing the respective level of achievement in the database in association with the respective student;
   (d) without aid of an instructor, receiving as input from each of the plurality of students an identification of a student's target language and a skill level of the student in the student's target language;
   (e) without aid of an instructor, receiving via the communication network an input from a first student included in the plurality of students the input including a selection of a first language learning role from among a choice of a role as a speaker in the first student's target language and a role as a speller in the first student's target language;
   (f) automatically in response to the input received from the first student and a stored level of achievement for the first student, without aid of an instructor, placing a second student in communication via the communication network with the first student to form a student-group, the second student automatically selected based, at least in part, on a stored level of achievement for the second student and an input received from the second student concerning the second student's target language and skill level, the second student automatically assigned a second language learning role based on the choice made by the first student;
   (g) automatically generating, without aid of an instructor, a word-deck for use by the student-group based on the input received from the first student and the second student, the word-deck including a plurality of words included in a sub-library selected from the plurality of sub-libraries because the sub-library includes words both in the target language and at the skill level, respectively, identified by the first student and the second student;

(h) automatically and without aid of an instructor, providing the first student with a graphical representation of a selected-word selected from the sub-library via the communication network, the graphical representation of the selected-word including a correct spelling of the selected-word;

(i) providing via the communication network an audio output to the second student, the audio output including the selected-word as spoken by the first student;

(j) receiving an entry including a spelling of the selected-word as spelled by the second student following a receipt of the audio output;

(k) automatically and without aid of an instructor comparing the spelling of the selected-word with the correct spelling; and (l) if the spelling of the selected-word matches the correct spelling of the selected-word, automatically improving a score for the student-group.

2. The method of claim 1, further comprising:
repeating acts (h)-(l) during a timed-period; and
displaying a time remaining in the timed-period to the first student and the second student at least until the timed-period ends.

3. The method of claim 2, further comprising determining the score for the student-group based at least in part on a quantity of words that are spelled correctly in entries provided by the second student during the timed-period.

4. The method of claim 1, further comprising
selecting the words included in the sub-library selected from the plurality of sub-libraries based on at least one characteristic selected from a group consisting of: a number of syllables included in each word, respectively; a difficulty of spelling each word, respectively; a difficulty of speaking each word, respectively; and a popularity of each word, respectively, in the target language.

5. The method of claim 1, wherein the-student-group is a first student-group, wherein the first student is a first speaker and the second student is a first speller, wherein the audio output is a first audio output, wherein the spelling is a first spelling, and wherein the method further comprises:

(m) forming a second student-group including a third student and a fourth student selected from the plurality of students, the third student acting as a second speaker and the fourth student acting as a second speller, respectively;

(n) providing the third student with a graphical representation of the selected-word;

(o) providing a second audio output to the fourth student the second audio output including the selected-word as spoken by the third student;

(o) receiving an entry including a second spelling of the selected-word as spelled by the fourth student following a receipt of the audio output;

(q) comparing the second spelling of the selected-word with the correct spelling; and (r) if the second spelling of the selected-word matches the correct spelling of the selected-word, improving a score for the second student-group.

6. The method of claim 5, further comprising:
repeating acts (h)-(l) and (n)-(r) during a timed-period; and
determining the score for the first student-group based at least in part on a quantity of words that are spelled correctly in entries provided by the second student during the timed-period;
determining the score for the second student-group based at least in part on a quantity of words that are spelled correctly in entries provided by the fourth student during the timed-period; and
sharing scoring results from the timed-period for each of the first student-group and the second student-group with both the first student-group and the second student-group.

7. The method of claim 6, further comprising requiring that the second student and the fourth student complete acts (j) and (p), respectively, independent of receipt of any context concerning the word.

8. The method of claim 5, wherein the selected-word provided to the first student is a first word,
wherein the selected-word provided to the third student is a second word, and
wherein the first word is different than the second word.

9. The method of claim 1, wherein the selected-word is a first word,
wherein a word to which the first word is related due to a phonetic similarity is a second word, and
wherein the method further comprises including in the audio output a sentence spoken by the first student, the sentence including each of the first word and the second word.

10. The method of claim 1, further comprising receiving the entry from a group consisting of: receiving the entry as typed by the second student; receiving the entry as handwritten by the second student; and receiving the entry as spoken letter-by-letter by the second student.

11. A non-transitory computer-readable medium whose contents cause a processing device including a processor to perform a method of providing peer-to-peer learning of a language by a plurality of students, each of the students located geographically remote from one another, the method comprising:

(a) establishing a word library including a plurality of sub-libraries each of the sub-libraries including a set of words in a target language that are organized together based on their relevance to a selected skill level in the target language, respectively, each word selected for inclusion in the word-library because the word forms a word-pair with another word in the target language, respectively, the word-pair formed because of a phonetic similarity between each of the two respective words in the target language;

(b) providing remote access over a communication network to a database including the word library to each of the plurality of students;

(c) automatically tracking performance in peer-to-peer learning sessions to establish a level of achievement for each of the plurality of students, respectively, and storing the respective level of achievement in the database in association with the respective student;

(d) without aid of an instructor, receiving as input from each of the plurality of students an identification of a student's target language and a skill level of the student in the student's target language;

(e) without aid of an instructor, receiving via the communication network an input from a first student included in the plurality of students the input including a selection of a first language learning role from among a choice of a role as a speaker in the first student's target language and a role as a speller in the first student's target language;

(f) automatically in response to the input received from the first student and a stored level of achievement for the first student, without aid of an instructor, placing a second student in communication via the communication network with the first student to form a student-group, the second student automatically selected based, at least in part, on a stored level of achievement for the second student and an input received from the second student concerning the second student's target language and skill level, the second student automatically assigned a second language learning role based on the choice made by the first student;

(g) automatically generating, without aid of an instructor, a word-deck for use by the student-group based on the input received from the first student and the second student, the word-deck including a plurality of words included in a sub-library selected from the plurality of sub-libraries because the sub-library includes words both in the target language and at the skill level, respectively, identified by the first student and the second student;

(h) automatically and without aid of an instructor, providing the first student with a graphical representation of a selected-word from the sub-library via the communication network, the graphical representation of the selected-word including a correct spelling of the selected-word;

(i) providing via the communication network an audio output to the second student, the audio output including the selected-word as spoken by the first student;

(j) receiving an entry including a spelling of the selected-word as spelled by the second student following a receipt of the audio output;

(k) automatically and without aid of an instructor comparing the spelling of the selected-word with the correct spelling; and (l) if the spelling of the selected-word matches the correct spelling of the selected-word, automatically improving a score for the student-group.

12. The non-transitory computer-readable medium of claim 11, the method further comprising:
repeating acts (h)-(l) during a timed-period; and
displaying a time remaining in the timed-period to the first student and the second student at least until the timed-period ends.

13. The non-transitory computer-readable medium of claim 12, the method further comprising:
determining the score for the student-group based at least in part on a quantity of words that are spelled correctly in entries provided by the second student during the timed-period.

14. The non-transitory computer-readable medium of claim 11, the method further comprising:
selecting the words included in the sub-library selected from the plurality of sub-libraries based on at least one characteristic selected from a group consisting of: a number of syllables included in each word, respectively; a difficulty of spelling each word, respectively; a difficulty of speaking each word, respectively; and a popularity of each word, respectively, in the target language.

15. The non-transitory computer-readable medium of claim 11, wherein the selected-word is a first word,
wherein a word to which the first word is related due to a phonetic similarity is a second word, and
wherein the method further comprises including in the audio output a sentence spoken by the first student, the sentence including each of the first word and the second word.

16. The non-transitory computer-readable medium of claim 11, the method further comprising:
receiving the entry from a group consisting of: receiving the entry as typed by the second student; receiving the entry as hand-written by the second student; and receiving the entry as spoken letter-by-letter by the second student.

* * * * *

UNITED STATES PATENT AND TRADEMARK OFFICE
CERTIFICATE OF CORRECTION

PATENT NO. : 10,839,714 B2
APPLICATION NO. : 15/791900
DATED : November 17, 2020
INVENTOR(S) : Mark Wasserman Page 1 of 1

It is certified that error appears in the above-identified patent and that said Letters Patent is hereby corrected as shown below:

In the Claims

Column 25, Line 3 delete the second occurrence of "selected".

Signed and Sealed this
Nineteenth Day of January, 2021

Andrei Iancu
*Director of the United States Patent and Trademark Office*